United States Patent [19]
Cho

[11] Patent Number: 6,081,402
[45] Date of Patent: Jun. 27, 2000

[54] HIGH-DENSITY DISK DRIVE WITH MULTI-ARM-TRACK-PER-HEAD ACCESS

[76] Inventor: Chin-Kuei Cho, 8805 Sunders La., Bethesda, Md. 20817

[21] Appl. No.: 09/037,913

[22] Filed: Mar. 9, 1998

[51] Int. Cl.$^7$ .............................. G11B 5/596; G11B 5/265
[52] U.S. Cl. ......................... 360/77.04; 360/121; 360/75
[58] Field of Search .................................. 360/77.04, 63, 360/61, 121, 75

[56] References Cited

U.S. PATENT DOCUMENTS

| | | | |
|---|---|---|---|
| 4,135,217 | 1/1979 | Jacques et al. | 360/77.04 |
| 5,452,165 | 9/1995 | Chen et al. | 360/121 |
| 5,606,474 | 2/1997 | Ketchersid, III | 360/98.01 |

*Primary Examiner*—Paul Loomis
*Assistant Examiner*—Dan I. Davidson

[57] ABSTRACT

A high density and high data rate disk drive with multi-arm-track-per-head access is disclosed. Small track width and small track pitch are achieved with small head-to-media distances and thin film magnetic head access arm. Track seek movements are totally eliminated for disk access. A plurality of thin film magnetic read/write heads is etched into a magnetic head arm. An assembly of a plurality of said magnetic head arms is provided to position each of said arms over each surface of each disk on said disk drive. An apparatus is structured with each assembly of said magnetic head arms to provide adjustment of track-head misalignment caused by environment temperature changes to eliminate thermal induced misregistration (TMR) effects. A plurality of said assemblies of magnetic head arms is provided to position multiple arms over the same surface of a disk, and over all surfaces of all disks, on said disk drive.

The magnetic head cross talk misregistration (CMR) and thermal induced misregistration (TMR) effects are totally eliminated. Removal of CMR effects is accomplished by etching a plurality of thin film magnetic read/write heads into an access arm while that of TMR effects is achieved through said TMR removal apparatus.

3 Claims, 26 Drawing Sheets

HIGH-DENSITY DISK DRIVE WITH MULTI-ARM-TRACK-PER-HEAD ACCESS

BACKGROUND OF THE INVENTION

The present invention generally relates to a mass data storage device, and more particularly to a high-density disk drive with high data rate multi-arm-track-per-head access to provide simultaneous device accesses to simultaneous access requests.

Typical disk drives are mass data storage and retrieval devices. A disk drive comprises a plurality of vertically stacked media disks mounted on a spindle connected to a motor that rotates the disks in unison. Each disk drive has an actuator arm. Each actuator arm has a plurality of read/write head actuators. Each actuator has a read/write head. Each read/write head is placed over the surface of a media disk. When the disk actuator arm performs radial moves, all of the read/write heads on the arm are moved in unison with the arm.

Each disk of a media disk drive has two parallel faces. Each face is coated with a magnetically permeable film. The face is subdivided into concentric tracks. Data are written to and read from these tracks. The read/write heads each comprise a magnetic element wrapped by a conductor coil. The read/write heads each is placed very close to the surface of the media disk. A read/write head is moved over the surface of a media disk to locate the concentric tracks for writing data to, or reading data from, the tracks.

Typical disk access in writing data to or reading data from the disk drives are slow, as compared to the speeds at which a computer CPU can process, store, or retrieve data to and from random access memory. The slowness in disk access is caused by that in data seek and transfer. The actuator arm has to be moved radially to locate the right track on the disk surface. Once the right track is located, it has to wait for the media disk rotation to align the data position with the read/write head. Data transfer rate is low, as it depends on the speed of the disk rotation. In addition, as only one read/write head is available to access a face of a media disk, multiple disk access requests to the disk face from the computer CPU has to be queued, waiting for access on a one-at-a-time basis. This limits the usefulness of such mass data storage and retrieval devices for simple and complex computer applications.

Mass data storage and retrieval require very high data rates (gigabits per second, or gbs) for more and more complex applications. An example is mass data storage and retrieval for multimedia computer applications in crucial environments such as the Internet.

Prior art aiming at disk drive improvement in providing mass storage and retrieval operations exists:

A. Prior art, as disclosed in U.S. Pat. No. 5,606,474, is a high density disk drive with accelerated disk access. Read/write heads and demultiplexer circuitry are mounted on a head mount disk to provide a track per head disk access;

B. Prior art, as disclosed in U.S. Pat. No. 5,016,128, is a superconducting quantum interference device (SQUID) for reading and a magnetic device for writing are mounted on a read/write head, providing track-per-device or less than track-per-device disk access;

C. Prior art, as disclosed in U.S. Pat. No. 5,452,165, provides a thin film magnetic heads linear array in accessing a less than track-per-track disk access;

D. Prior art, as disclosed in U.S. Pat. No. 3,829,895, provides a multi-channel magnetic head with offset gap lines for track-per-head tape applications;

The present invention is a preferred embodiment aiming at improving mass data storage and retrieving operation on a disk drive. Specifically, the present invention is aiming at improving problems associated with said prior art disclosed in said patents:

A. Many problems exist in said prior art, as disclosed in U.S. Pat. No. 5,606,474:

a. It is disclosed that the head mount disks and the media disks have the same, or substantially similar, thermal coefficient of expansion. The head mount disks and the media disks expand and contract as a unit. As a result, the surface mounted heads of the head mount disk move together with tracks of the media disks in response to temperature variations. Therefore, the heads remain accurately positioned over the tracks of the media disk despite temperature variations.

In reality, this is true only when both the head mount disks and the media disks are mounted in a similar manner. As the head mount disks are mounted on the openings at opposite ends of the head mount disk and the media disks are mounted to the spindle, this structure does not provide the head mount disks and the media disks to expand and contract as a unit. The media disk tends to expand in a direction away from the spindle while the head mount disk in a direction toward the spindle when temperature increases, and vice versa. Therefore, once mounted, the heads may no longer remain accurately positioned over the tracks of the media disk all the time with temperature variations. Therefore, misalignments between the tracks and read/write heads can occur. Adjustments to said misalignments due to temperature variation are not available in this prior art. This render the disk drive impractical or unacceptable.

b. Because of said problem a above, a slight change in temperature will cause an unacceptable movement of the heads in the head mount disk relative to the tracks which results in unacceptable sidewriting or side reading. This is known as thermal induced track misregistration (TMR, as indicated in U.S. Pat. No. 5,452,165). Corrections to this problem are not stated in U.S. Pat. No. 5,606,474. Thus, once the TMR occurs in the disk drive in U.S. Pat. No. 5,606,474, there is no way to correct the problem This renders the device impractical or unacceptable.

c. As disclosed in U.S. Pat. No. 5,606,474, all heads, demultiplex chips are mounted on a large area on a face of a head mount disk. Said disk expands and contracts with temperature variations, together with physical vibration in practical installation and applications, this can cause some or all of the heads and chips on said head mount disk to become loose in aging. This will shorten the life of said disk and renders the disk impractical or unacceptable.

d. Magnetic head cross talk occurs when two adjacent heads are assembled too close each other. Said cross talk can also result in sidewriting and sidereading. This is referred to as Cross-talk Misregistration (CMR). Corrections to said CMR are not addressed in U.S. Pat. No. 5,606,474. This renders said disk drive impractical or unacceptable.

B. Many problems exist in prior art, as disclosed in U.S. Pat. No. 5,016,128:

a. Accessing a disk track requires two different devices: one for read operation and the other for write operation. The read device is a superconducting quantum interference device (or SQUID), while the write device is an electromagnet or electromagnet with a laser. This makes the construction of the disk access structure complex.

b. Due to said problem (1), the size of the read and write devices may not be small enough to enable positioning one read one write device on one track. Therefore, mechanical movement of the read write devices to the right track cannot be totally eliminated. This still slows down disk track access.

c. Even the reading device is of the SQUID type, the writing device is still of an electromangetic type. Therefore, the size of the magnetized area on the disk surface is directly proportional to the distance the write device is placed over the disk. The larger the distance, the larger the magnetized area. Therefore, the advantage of the larger distance a SQUID read device can be placed over the disk surface is offset by the larger the magnetized area on the surface written by the writing device.

d. It is disclosed that a write device magnetic coil can be mounted below the disk to have its magnetic field penetrate through the disk to the magnetic medium layer on the opposite side of the disk, using a laser to heat a region of the medium layer, only one side of the disk surface can be used.

e. While a mechanism is provided for adjusting track-head misalignment to eliminate the TMR effects, no mechanism is provided to reduce/eliminate the CMR effects caused by magnetic writing device. Therefore, two such writing devices cannot be placed too close each other or magnetic insulation band is required.

f. The prior art requires that the SQUID in the read/write head be in a superconducting state for the device to operate. Constant cooling to keep the temperature above 77 K needs constant supply of cooled gas from liquid coolant, such as liquid nitrogen.

These problems make the disk structure impractical for high data rate and high density data storage.

C. Many problems exist in prior art, as disclosed in U.S. Pat. No. 5,452,165:

a. The magnetic heads are close packed in a linear array in a "side-by-side" longitudinal arrangements. The "head" pitch is in the range of 50–300 microns; the track pitch is in the range 5–30 microns; and a skew angle θ herein explained later is in the range 1–5 degrees. This arrangement is impractical.

b. Each magnetic head uses a P1T/G/P2 T arrangement for each thin film magnetic head linear array to reduce or eliminate the thermal induced track misregistration (TMR). This arrangement results in head pitch of the heads in the array ranging from 50 to 300 microns. This pitch is too long for practical application.

c. Because of said Problem b, the head density on the substrate is reduced. This requires lengthy array for very high data rate applications. In particular, in a typical modern day hard disk having 2,000 or more tracks, the array length of this structure would be 100,000–600,000 microns which is too long and impractical.

d. Because of said Problem c, it is necessary to mount the heads on a slider which is connected to a head suspension assembly over a magnetic medium disk. It is then connected to a Servo and then to an electric circuitry for hard disk applications. This makes the structure of a hard disk complex and bulky. In addition, it requires too many mechanical movements in aligning magnetic heads to data tracks. One is the mechanical movement of the slider required by simultaneous read operations or simultaneous write operations, and the other the adjustment of the "skew angle", which is explained herein later, to align data tracks with magnetic heads caused by temperature change.

e. Servo control information is stored in dedicated Servo tracks for controlling alignment of data tracks and the magnetic heads in the linear array, resulting waste in precious tracks.

f. All magnetic heads arranged in a linear array perform simultaneous read operations, or simultaneous write operations. This arrangement is practical only in situations where data in stored media are static, not subject to change. In situations where data are subject to change, some magnetic head(s) in a linear array must perform some read operation(s), some head(s) must perform some write operation(s), and some would perform no operation(s). These operations may not be performed simultaneously among all of the magnetic heads in the array.

This renders the prior art not acceptable in many applications.

g. The adjustment of the skew angle alone is insufficient for aligning data tracks with magnetic heads. A magnetic head array expands to, or contracts from, both ends when temperature changes. Furthermore, expansions or contracts of magnetic medium caused by mechanical support need movement of the linear array in combination with skew angle adjustment. For example, a magnetic disk is supported by a spindle which causes the disk to expand in one direction, or contract in another. This requires too many mechanical adjustments of the linear array to align with data track. The adjustment is difficult to control in practice.

D. Problems exist in prior art, as disclosed in U.S. Pat. No. 3,829,895:

a. A magnetic head consists of three parts: one magnetic back core having conductor windings and two magnetic tip cores. Said parts are joined together, using any available and suitable adhesive, to form a unshaped electromagnet. There is a gap between the back core and a tip core, and another gap between the back core and the other tip core. The gap may prevent magnetic signal from the disk from reaching the back core to be sensed. This is because of the well known fact that the strength of a magnetic field between two magnetic poles is inversely proportional to the square of the distance between the poles. The structure of the magnetic head in this prior art can cause loss of magnetic signal from the disk to the back core, owing to the gap between the back core and a tip core. Therefore, the head so joined requires more power to magnetize the head or to sense the magnetic signal from the disk. Therefore, temperature in the disk environment can be higher and higher due to more power is consumed in offsetting the effect of said gaps. This renders the device impractical or undesirable.

Therefore, there is a need for an improved disk drive over the prior art to provide high data rate high density data storage that totally eliminates the CMR and TMR effects.

SUMMARY OF THE INVENTION

The present invention meets the above said needs providing improvements over the disk drives, as disclosed in U.S. Pat. Nos. 3,829,895, 5,016,128, 5,606,474, and 5,452,165.

Said improvements are accomplished through use of a disk drive system with increased data storage density and productivity in disk access in a factor of A times faster than the currently available disk drive technology, where A is the number of disk access arms deployed on the disk drive system. This is done by providing a plurality, A, of disk access arms over a surface of each disk. Etched into each of said arms is a plurality, H, of thin film magnetic read/write heads, providing track-per-head access that requires zero track seek time.

The disk drive system comprises a stack of media disks rotatably mounted within a housing. A plurality, A, of disk access arms are positioned over each surface of each disk in the disk stack. In a disk system having K disks, there are K×2×A disk access arms positioned over the 2 K surfaces of the K disks. The tracks on each surface of the disks are created and accessed by the thin film magnetic read/write heads etched in each of the disk access arms. Therefore, there are H tracks that can be created by the heads in a disk access arm. A head stacked in the same position in all of the disk access arms over the same surface is accessing the same track. This provides a multi-arm-track-per-head disk drive system.

For example, a disk drive system having 6 disks, 128 disk access arms placed over each surface of the 6 disks, each of said arms having 2,048 heads, then there are 128×12=1,536 said arms. There are 2048 tracks on each disk surface that can be created and accessed by the 2,048 heads in an arm. This disk drive system then provides 128 times faster than currently available disk drive technology.

The present invention uses a close stacked thin film magnetic head linear arm to provide very high disk data rates and very high data density required by present day applications. The present invention can provide track widths in the range of 1–5 microns and head pitch 2–6 microns. A mechanism for adjustment of track-head misalignment caused by environment temperature change is provided to totally eliminate the TMR effects. The CMR effects are eliminated by the structure of the thin film magnetic heads.

In contrast to the pancake and the close packed magnetic head linear array, as disclosed in the U.S. Pat. No. 5,452,165, the present invention uses a "front-back" PlT/G/p2 T and p1T/G/P2 T arrangement for a thin film magnetic head, where P1 represents the front portion, which is long, of the first pole piece, G refers to a gap member, and p2 represents the front portion, which is short, of the second pole piece, of the "first" head in the linear arm; p1 refers to the front portion, which is short, of the first pole piece, while P2 the front portion, which is long, of the second pole piece of the "second" head in the linear arm. And so on. A conductor is coiled about each pole piece a number of turns to produce a flux intensity for read or write operations. A thin film magnetic head so constructed with pole pieces is fully described in U.S. Pat. No. 3,662,119 to Lubomyr Romankiw, et al., which patent is referenced herein.

In the present invention, the magnetic heads are stacked with a P1 T/G/p2 T, or p1T/G/P2 T, pole tip pattern for each magnetic head in a linear arm. (The stacking is similar to book shelving on a stack. The "front" of the second book faces the "back" of the first book, and so on, on the shelf.) The foot print in this stacking is very short. The head pitch is 2–5 microns.

The present invention is a track per head structure for magnetic disk applications. It employs no skew angle to align magnetic heads with data track. The "cross talk" between adjacent tracks is totally eliminated in accessing data track, as explained herein later.

A. The present invention is a preferred embodiment to prior art, as disclosed in U.S. Pat. No. 5,606,747, because of the following:
  a. Access time per arm is as fast as the prior art.
  b. The present invention can process a plurality of accesses simultaneously, as compared with the prior art which can process only one access at a time.
  c. Because of b above, the data rate of the present invention is higher, in a magnitude of the number of access arms. For example, if 128 arms are assembled for the disk, the data rate will be up to 128 times faster than the prior art.
  d. The present invention provides mechanisms to totally eliminate the CMR and TMR effects, while the prior art provides no mechanisms to reduce/eliminate the CMR and TMR effects.

B. The present invention is a preferred embodiment to prior art, as disclosed in U.S. Pat. No. 5,016,128, because of the following:
  1. A mechanism for eliminating the CMR effects is provided.
  2. No cooling of the reading device is needed, hence eliminating constant supply of liquid coolant.
  3. No track access movements are required. (Only occasional movements for eliminating the TMR effects are required.)

C. The present invention is a preferred embodiment to prior art, as disclosed in U.S. Pat. No. 5,452,165, because of the following:
  a. The magnetic heads are closely stacked in a linear arm, in a "front-back" latitudinal arrangements, having the "head" pitch being in the range of 2–5 microns and track pitch being in the range of 1–3 microns.
  b. To totally eliminate the CMR, each magnetic head uses a P1 T/G/p2 T, or p1T/G/P2 T, arrangement for each thin film magnetic head linear arm.
  c. In a modern day application in which a disk has 2,000 or more tracks, the arm length is only 8,000–12,000 microns.
  d. A simple mechanism is provided to totally eliminate the TMR effects. No complex structure of slider, suspension assembly, and the so-called skew angle alignment is needed to deploy the present invention.
  e. No mechanical movements in accessing disk data tracks by the magnetic linear arm are needed (except for eliminating the TMR effects).
  f. Servo control information is embedded periodically in each data track. No precious data tracks are dedicated for Servo control information storage.
  g. Not all magnetic heads in the linear arm simultaneously read data from, or simultaneously write data to, magnetic medium disk or tape. Each magnetic head performs either read, write, or no operation in managing mass data. This makes deployment of the linear arm for modern multimedia and Internet application practical.

D. The present invention is a preferred embodiment to prior art, as disclosed in U.S. Pat. No. 3,829,895, because of the following:
  The multi-channel magnetic head of the present invention consists of only one part. The magnetic "back" core having conductor windings and two magnetic tip cores are one body. There is neither gap between the back core and a tip core, nor gap between the back core and the other tip core. Therefore, neither magnetic signals from the disk can weaken nor lost. In addition, power needed for the magnetic head to operate in the present invention is small, as compared with that needed by the head in U.S. Pat. No. 3,829, 895.

An object of the present invention is to provide an improved disk drive.

Another object of the present invention to provide an improved disk drive with rapid disk access.

Still another object is to achieve any of the above objects and totally eliminate track seek operation.

A further object of the present invention is to provide a closely stacked thin film magnetic head linear arm for very high data rates in massive data storage, update, and retrieval.

Another object is to achieve any of the above objects and in achieving tiny track width.

A still another object is to achieve any of the foregoing objects and totally eliminate cross-talk sidereading and sidewriting, or cross-talk misregistration (CMR).

A further object is to achieve any of the foregoing objects and totally eliminate off-track performance or track misregistration (TMR).

Still another object is to achieve any of the above objects and deploying a thin film magnetic head arm which is constructed by thin film magnetic head batch techniques.

A further object is to achieve any of the above objects and to provide a plurality of arms on one disk surface.

A further object is to achieve any of the above objects and to provide adjustment of track-head misalignment caused by environment temperature change.

A further object is to achieve any of the above objects and to provide an assembly of a plurality of arms each arm being on a surface of disk.

Other objects will be clear in the following description of the invention.

DETAILED DESCRIPTION OF THE INVENTION

Figure 1:
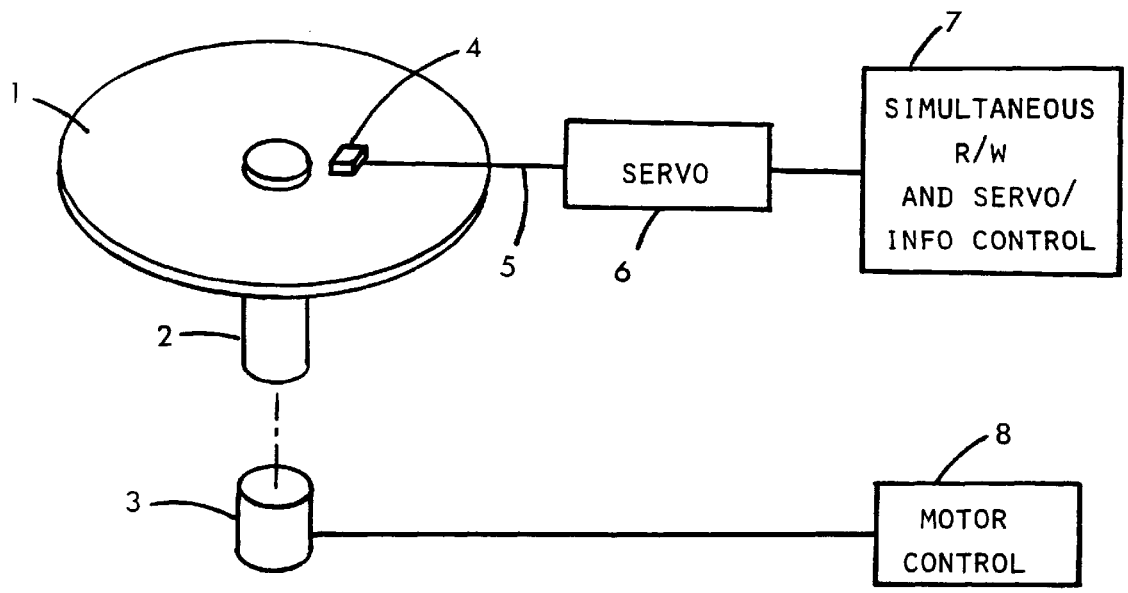
FIG. 1 is an illustration of a magnetic disk drive with a slider comprising the close packed magnetic head linear array disclosed in U.S. Pat. No. 5,452,165.

Referring to the drawings FIGS. 1 to 40, wherein same reference numbers and characters indicate same or similar parts across illustrations, and a dotted line indicate a line of an object behind an object on the drawings.

FIG. 1–FIG. 6 relate to the invention of Close Packed Magnetic Head Linear Array, as disclosed in U.S. Pat. No. 5,452,165.

FIG. 1 depicts the deployment of the magnetic head linear array with a magnetic medium disk of the prior art, as disclosed in the U.S. Pat. No. 5,452,165. Therein 1 is a magnetic medium disk being driven by spindle 2 rotated by the motor 3 with signals from the Motor Control 8. 4 is the linear array arranged in a slider being supported by a suspension assembly 5 and controlled by Servo 6 driven by signals from the simultaneous read/write (R/W) and Servo/Info Control circuitry 7.

Figure 2:
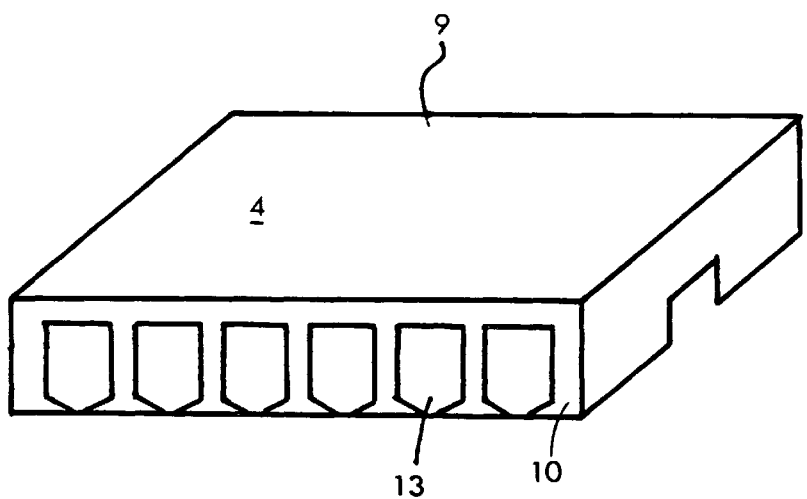
FIG. 2 is a perspective view of the close packed magnetic head linear array assembly for the disk shown in FIG. 1.

FIG. 2 shows the magnetic heads 13 assembled on a side 10 of the slider 4 being suspended by the assembly 5 shown in FIG. 1, as disclosed in U.S. Pat. No. 5,452,165.

Figure 2A:
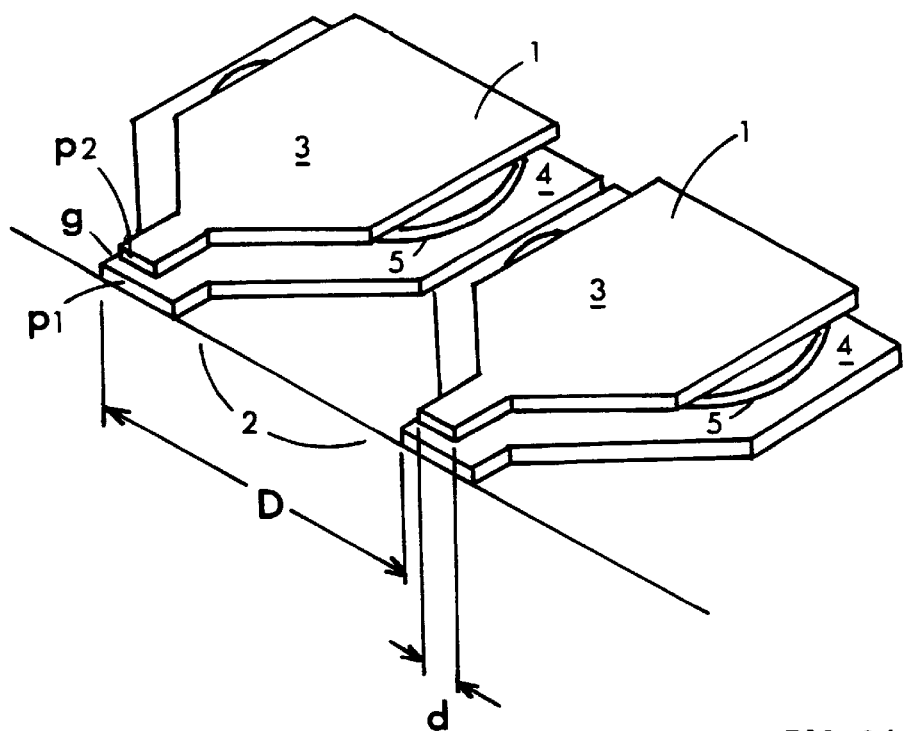
FIG. 2A illustrates a pancake type thin film magnetic read/write head structure.

FIG. 2A depicts a "pancake" type of thin film magnetic head structure.

Figure 3:
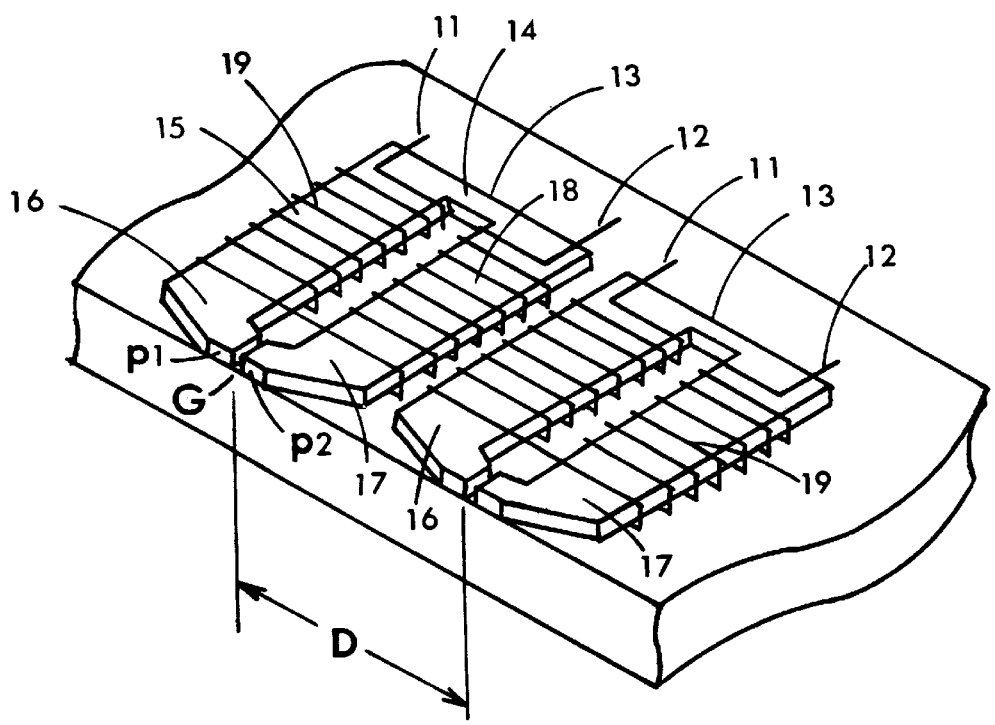
FIG. 3 is an illustration of the prior art thin film magnetic heads with side-by-side pole tips packed in a linear array, as disclosed in U.S. Pat. No. 5,452,165.

FIG. 3 depicts the prior art of close packed magnetic head linear array disclosed in U.S. Pat. No. 5,452,165. Therein each magnetic head 13 has two pole pieces 15 and 18 which have two front portions 16 and 17, respectively. The front portion of the pole piece 16 has the pole tip P1. The front portion of the pole piece 17 has the pole tip P2. The pole pieces 15 and 18 are connected by a back portion 14 and are coiled about by a conductor 19. The coil of conductor of each magnetic head ends at two terminals 11 and 12. The magnetic heads are packed in a side by side "longitudinal" relationship. Sandwiched between the pole tips P1 and P2 is a gap layer G. The gap to gap spacing, D, of the heads in the linear array is called the head pitch, and is in the range of 50–300 microns.

Figure 4:
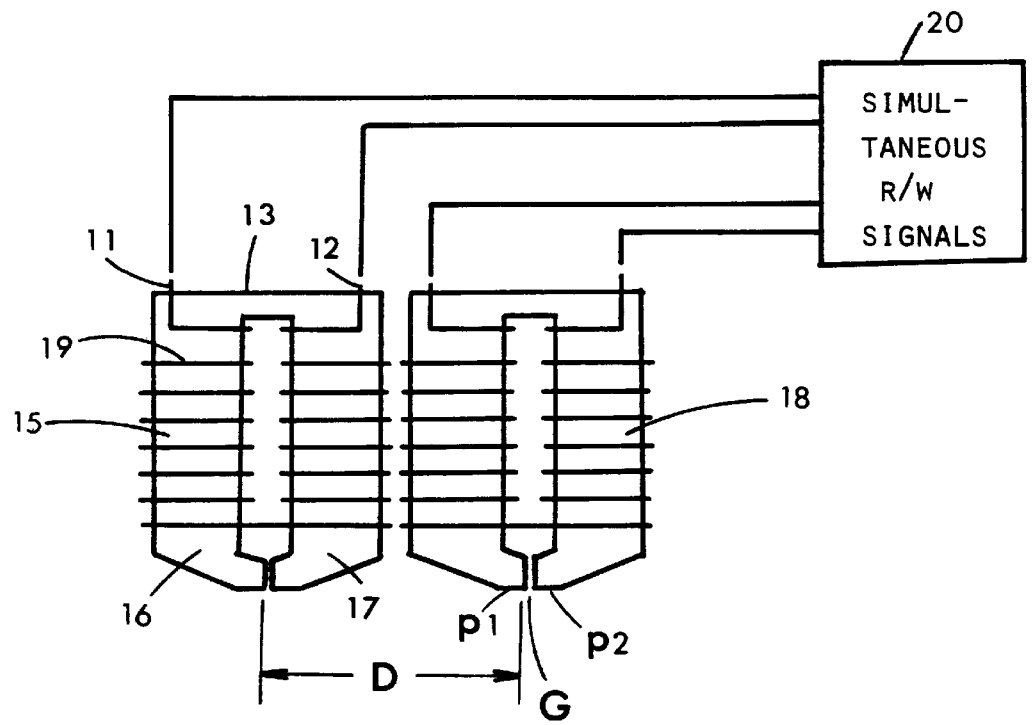
FIG. 4 is a "top" view of the electrical arrangement of the linear array, as disclosed in U.S. Pat. No. 5,452,165.

FIG. 4 shows a "top" view of the magnetic heads shown in FIG. 2, with the two terminal ends 11 and 12 of the coil conductor of each magnetic head 13 connected to the simultaneous R/W SIGNALS circuitry 20.

Figure 5:
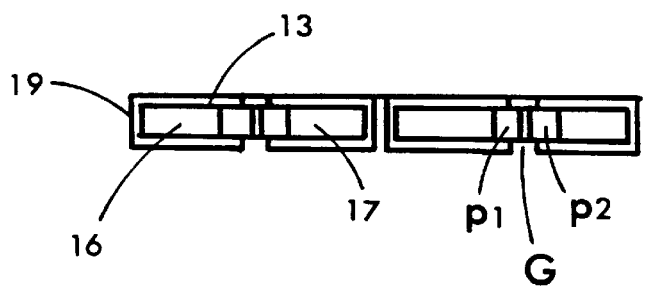
FIG. 5 is a "front" view of the top view illustrated in FIG. 4 of the linear array in FIG. 3, as disclosed in U.S. Pat. No. 5,452,165.

FIG. 5 depicts a "front" view of the top view of the two magnetic heads illustrated in FIG. 4.

Figure 6:
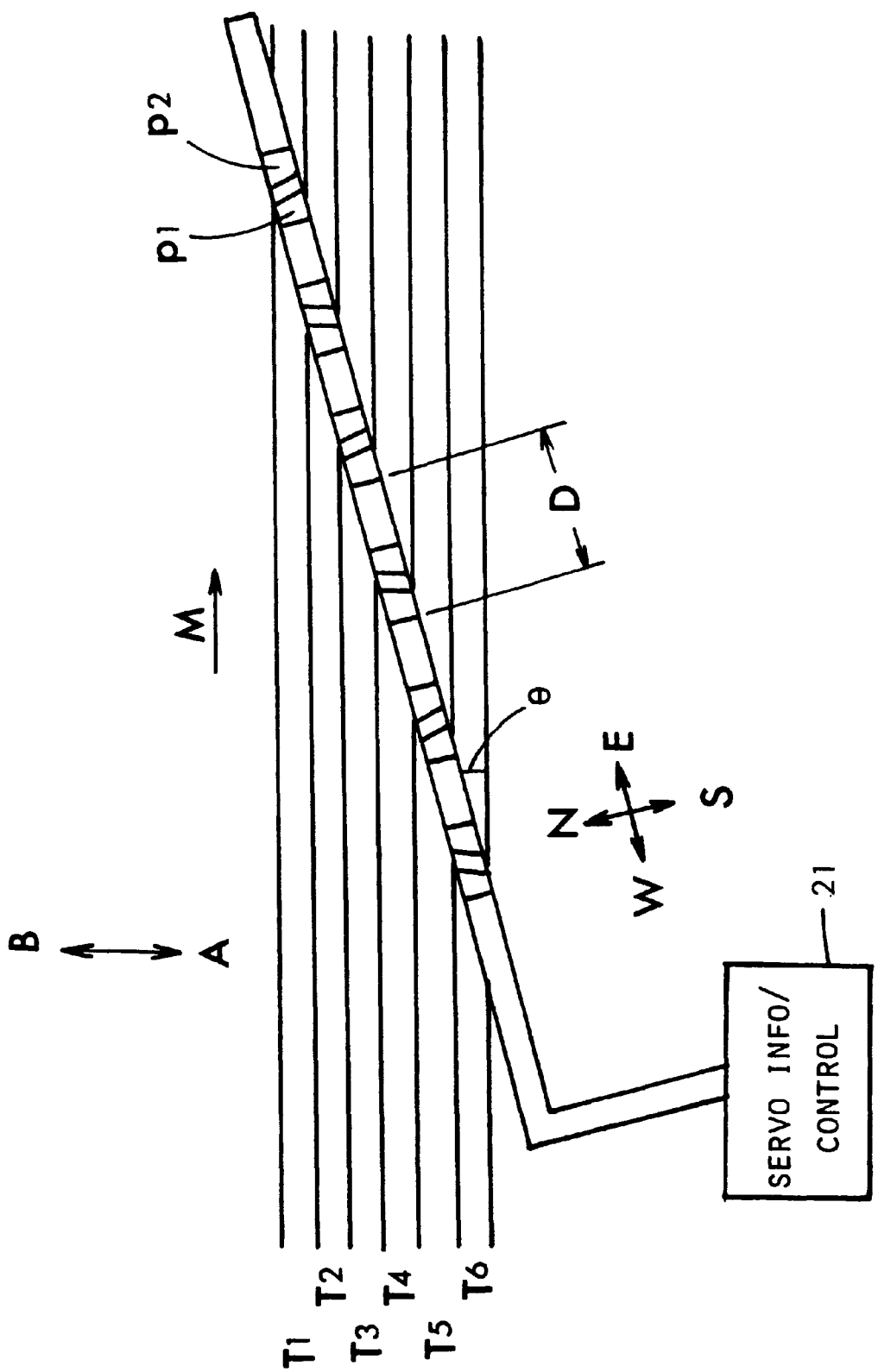
FIG. 6 is an illustration of a plurality of heads of the magnetic head linear array positioned at a skew angle θ with respect to a plurality of tracks on magnetic media, as disclosed in U.S. Pat. No. 5,452,165

FIG. 6 shows servo control of the magnetic head array in the prior art disclosed in U.S. Pat. No. 5,452,165. The illustrated tape or disk magnetic media, moving in a predetermined direction such as M, has six tracks, of which tracks T1 and T6 are servo tracks and tracks T2, T3, T4, and T5 are data tracks. The pole tips P1 and P2 of each magnetic head 14, which is not shown, are positioned with the longitudinal axis of the linear array of heads at a skew angle θ, with respect to the longitudinal axis of the tracks. Each head reads or writes its respective track. The prior art can easily handle any number of tracks by simply providing a magnetic head 14 for each track on the magnetic medium. The head spacing D is about 100 microns, the thickness of each pole tip P1 and P2 is about 3 microns, and the skew angle θ is 1–5 degrees. The acceptable range for D is 50–300 microns; that for the track pitch T, T=D sin θ, is about 5–30 microns, and that for θ is 1–5 degrees. The servo control 21 of the magnetic head array of this prior art is complex. It requires control of the skew angle θ to align the heads with the tracks during slight temperature change. Temperature variations cause the medium to expand or contract in both directions A and B. It also requires control of the magnetic head linear array in one longitudinal direction W or E due to magnetic medium mechanical support arrangement. The entire magnetic medium can shift in only one direction, A or B, because tape or disk mechanical support arrangement. Therefore, the servo control requires complex movement of the magnetic head linear array in a combination of directions of N (north), S (south), E (east), and W (west), as shown in FIG. 6. This servo control is impractical.

FIG. 7–FIG. 12 relate to the prior art High Density Disk Drive with Accelerated Disk Access disclosed in U.S. Pat. No. 5,606,474.

Figure 7:
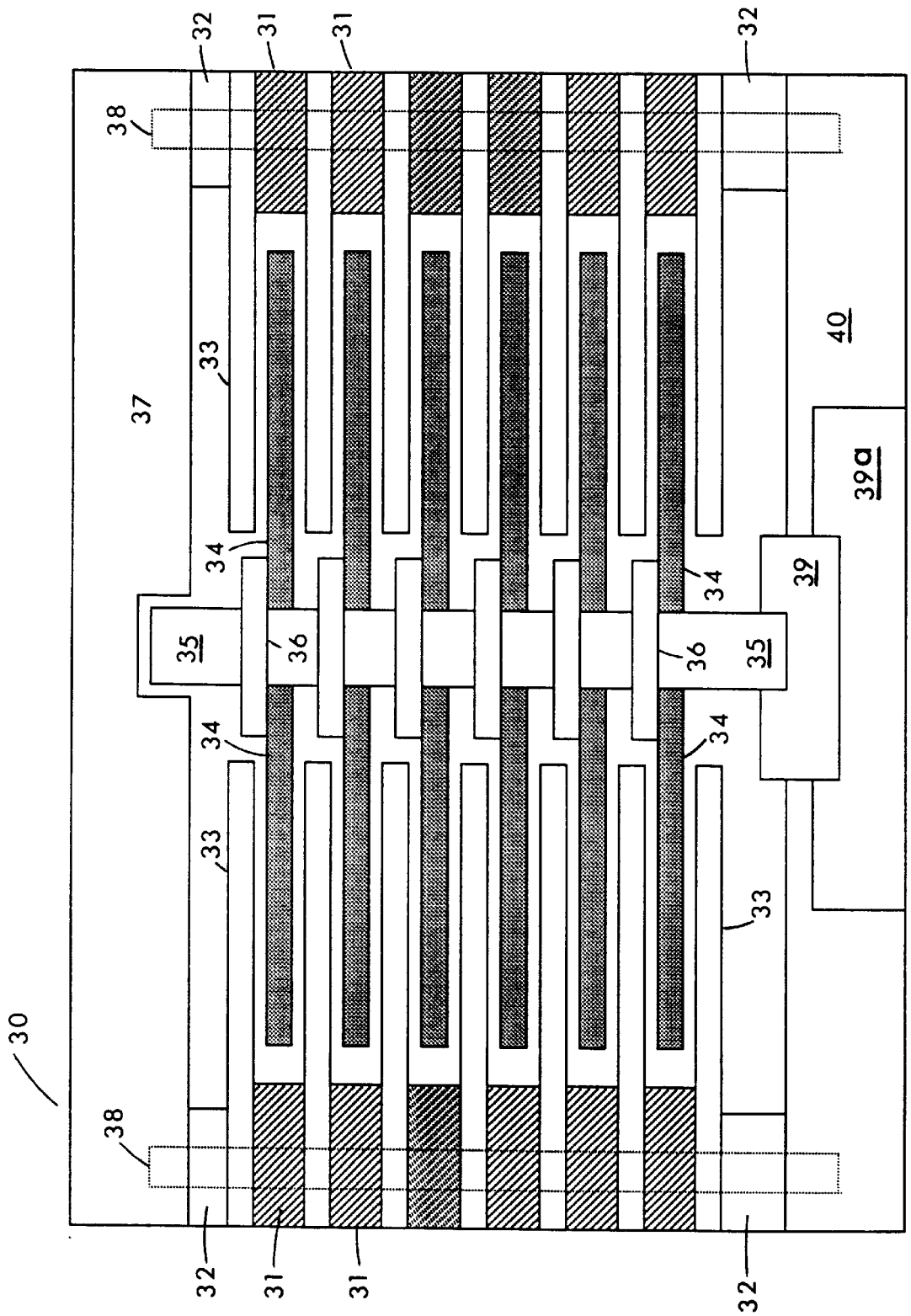
FIG. 7 is a cross-section view of the disk drive showing the media disks rotatably mounted within the housings in a spaced apart relation with the head mount disks, as disclosed in U.S. Pat. No. 5,606,474.

FIG. 7 is a cross-section view of the disk drive showing the media disks 34 rotatably mounted within the housings in spaced apart relation with the head mount disks 33. The disk drive 30 comprises a plurality of vertically stacked media disks 34 in space relationship with one another. The disks 34 are mounted on the spindle 35 with a mounting collar 36 rotated by the motor 39a. The spindle 35 is connected to the motor 39a with the motor collar 39.

Each media disk 34 is bounded by a spacer ring 31 having a predetermined thickness. The space ring 31 are separated from one another by abutting head mount disks 33. Each of the head mount disks 33 has a plurality of electromagnetic heads (not shown in FIG. 7) etched therein on each side of the head disk that faces the corresponding surface of a media disk 34. All the heads etched on the surface of a head mount disk lie in a single plane on the surface of the head mount disk.

The uppermost head mount disk 33 and the lowermost head mount disk 33 are each separated by a spacer 32 from the top 37 and the bottom 40 of the disk drive 30, respectively. The spacer 32, head mount disks 33, and spacer rings 31, and spacer 32 are fixed by a pair of pins 38, as shown in FIG. 7.

Figure 8:
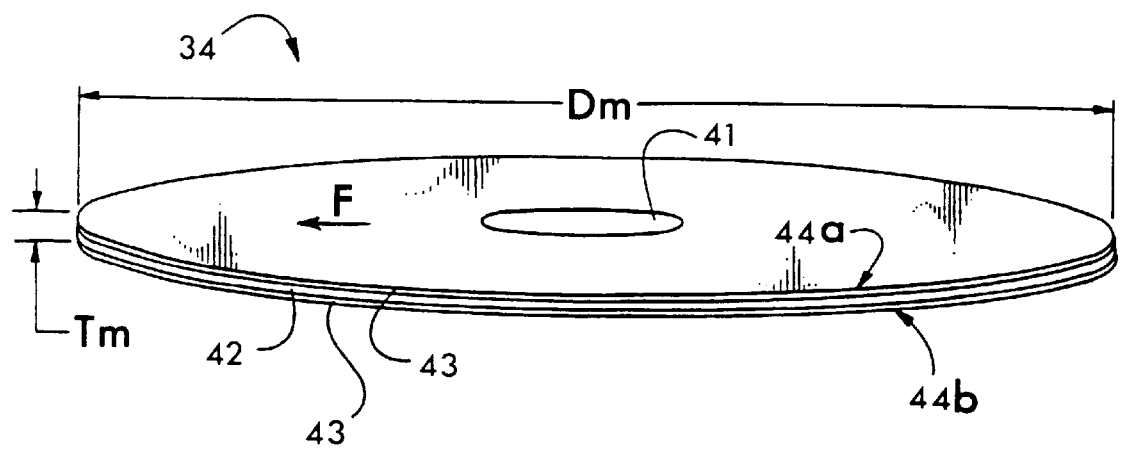
FIG. 8 is a perspective view of the media disk, as disclosed in U.S. Pat. No. 5,606,474.

FIG. 8 shows a perspective view of the media disk disclosed in the prior art in U.S. Pat. No. 5,606,474. The media disk 34 is a circular shape with two parallel faces, 44a and 44b. The disk is fixed to the spindle 35 via the orifice 41. The diameter and thickness of the disk are Dm and Tm, respectively. The disk is coated on both faces with a magnetic film 43 which is ferric in nature and is coated to the ceramic substrate 42. Each of the disk 34 can store 307 megabytes (MB) of data. Data storage on media disk 34 is accomplished in the same was as it is in conventional high density disk drives.

Figure 9:
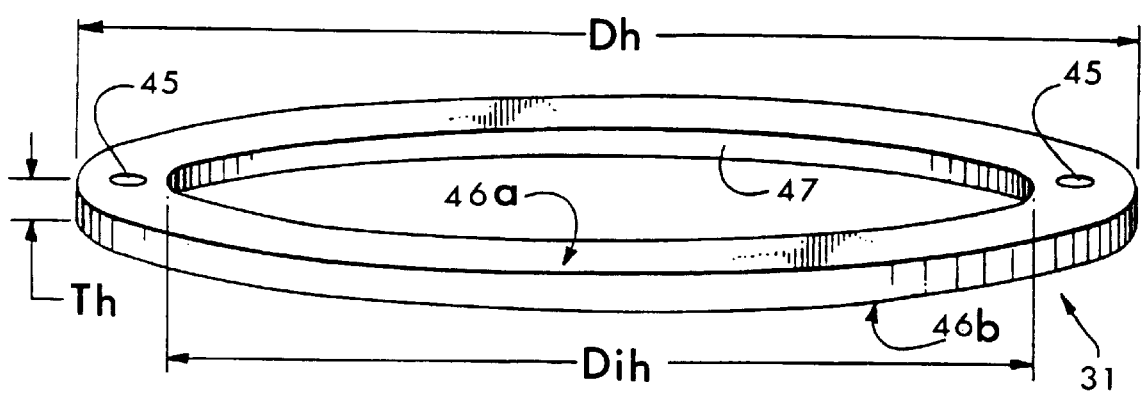
FIG. 9 is a perspective view of the ring for housing the head mount and media disks, as disclosed in U.S. Pat. No. 5,606,474.

FIG. 9 depicts a space ring 31 having two edges 46a and 46b and an inner surface 47 for housing the disk 34 inside the ring. Two holes 45 are provided in the opposite ends for fixing the ring 31, head mount disk 33, and spacers 32 together. The ring has an outside diameter, inside diameter, and thickness Dh, Dih, and Th, respectively. The inside diameter Dih is slightly larger than the media disk diameter Dm shown in FIG. 8 so that the media disk 34 can be housed inside the ring 31.

Figure 10:
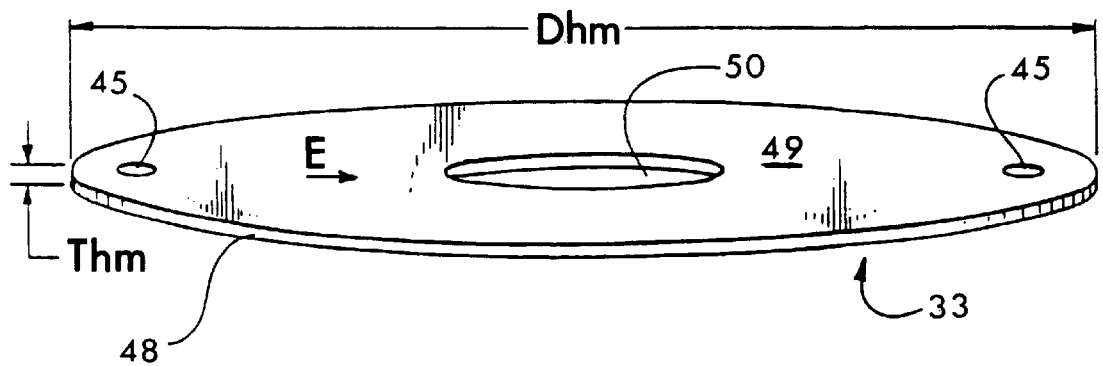
FIG. 10 is a perspective view of the head mount disk, as disclosed in U.S. Pat. No. 5,606,474.

FIG. 10 illustrates the circular, or other shaped, head mount disk 33 having planer surfaces 49 on both sides of the substrate 48. A head mount disk 33 is placed above or below a surface of a surface of a media disk 34 at a selected tinny distance. The head mount disk 33 has an orifice 50 which is used to place the disk with the spindle 35 in a space relationship to allow free rotation of the spindle. The disk 33 has two holes for fixing the disk 33, the space rings 31, and spacer 32 together. The diameter and thickness of the head mount disk are Dhm and Thm respectively.

It is said that the head mount disks 33 and the media disks 34 have the same, or substantially similar, thermal coefficients of expansion, they expand and contract as a unit. As a result, the head mount disks 33 move together with tracks of the media disk 34 in response to temperature variations. Therefore the heads 53 and 55, as shown in FIGS. 11 and 12, remain accurately positioned over the tracks of the media disk 34 despite temperature variations.

In reality, it is true that the heads 53 and 55 will remain accurately positioned over the tracks of the media disk 34 despite temperature variations only when the head mount disk and media disk are fixed in the same manner. However, as the media disk 34 is fixed on the spindle 35 while the head mount disk is fixed on the space rings 31 via the holes 45, the two disks cannot expand and contract as a unit. The head mount disk 33 tends to expands in the direction toward the orifice 50, or spindle 35, as indicated as the E arrow in FIG. 10, while the media disk 34 tends to expand in a direction away from the spindle 35, as indicated as the F arrow in FIG. 8, and vice versa, when temperature varies. No mechanism was provided in the prior art to adjust head and track misalignment due to temperature variations. This render the prior art difficult or impractical for applications.

Figure 11:
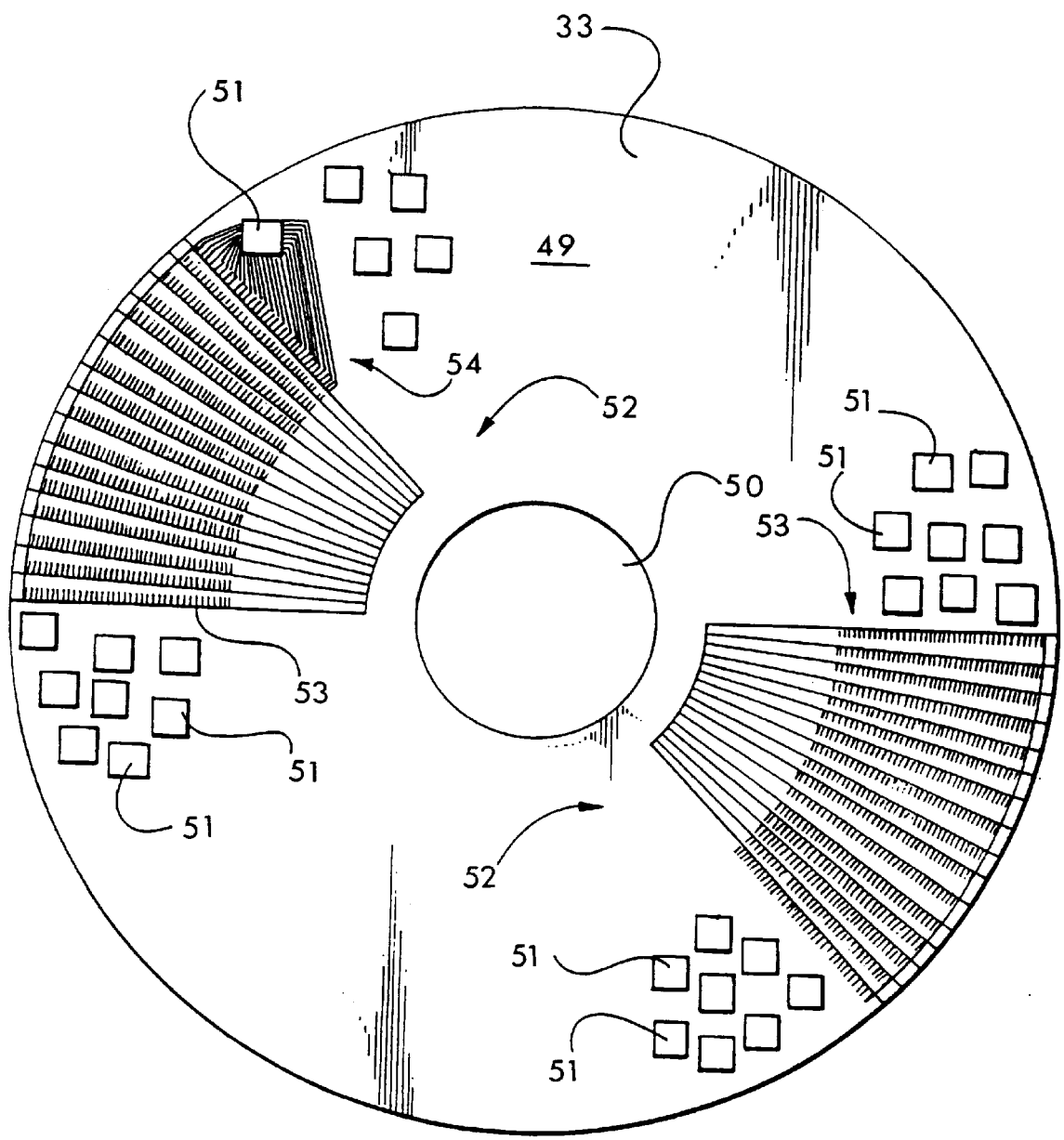
FIG. 11 is a bottom view of the head mount disk of FIG. 10 showing a surface mounted head assemble, as disclosed in U.S. Pat. No. 5,606,474.

FIG. 11 shows each head assembly 52 with a plurality of heads 53 and 55, and demultiplexer circuits 51 on a surface of the head mount disk 33 in FIG. 10.

Figure 12:
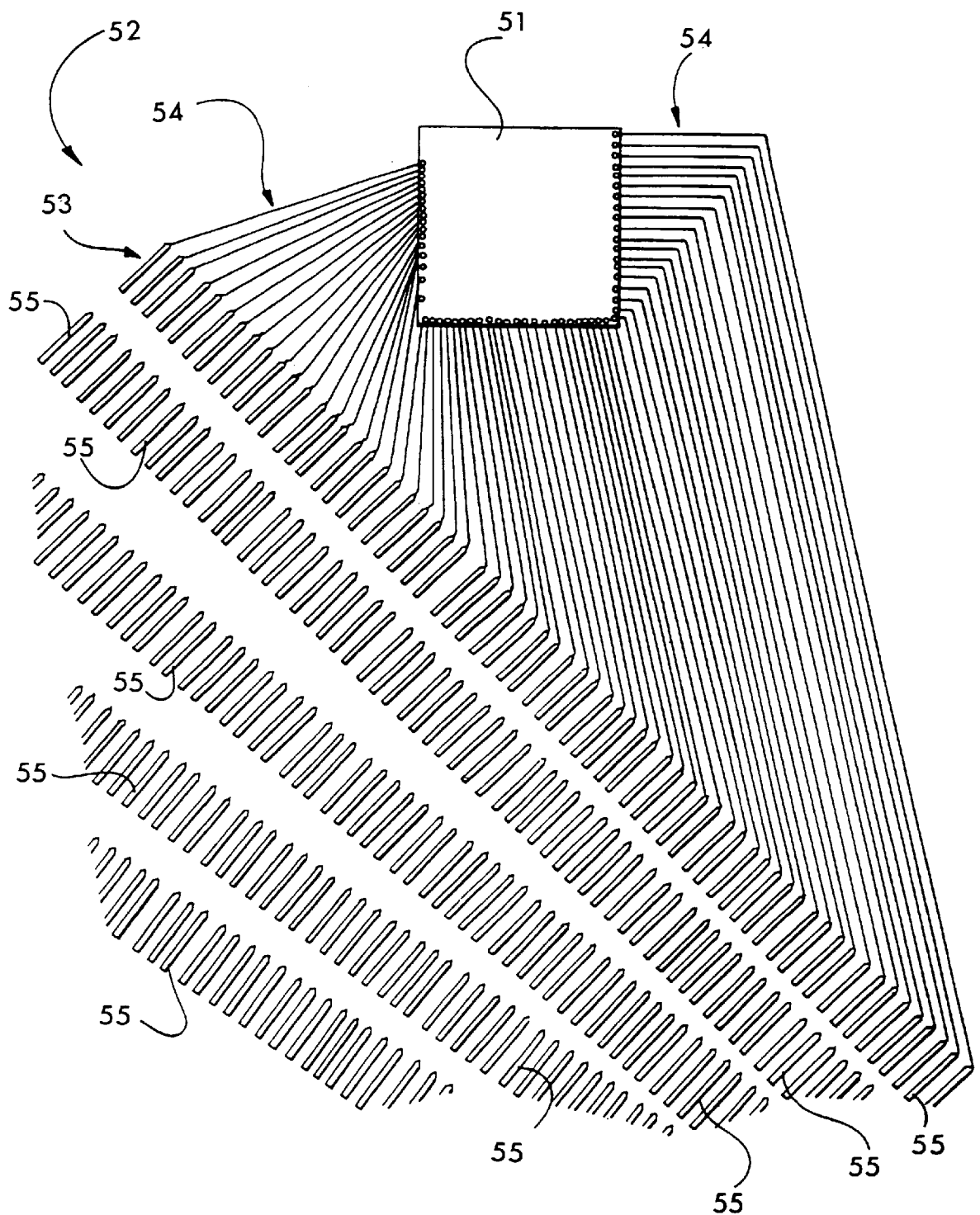
FIG. 12 is an enlarged fragmentary view of the surface mounted head assembly of FIG. 11 showing the interlacing of the heads and their connection to a demultiplexer, as disclosed in U.S. Pat. No. 5,606,474.

FIG. 12 provides a detailed view of a portion of the head mount disk 33 in FIG. 11. There are a plurality of output lines from demultiplexer 51, each of the output lines is connected to one head 53 via one of lines 54.

FIG. 13–FIG. 40 relate to the present invention.

Figure 13:
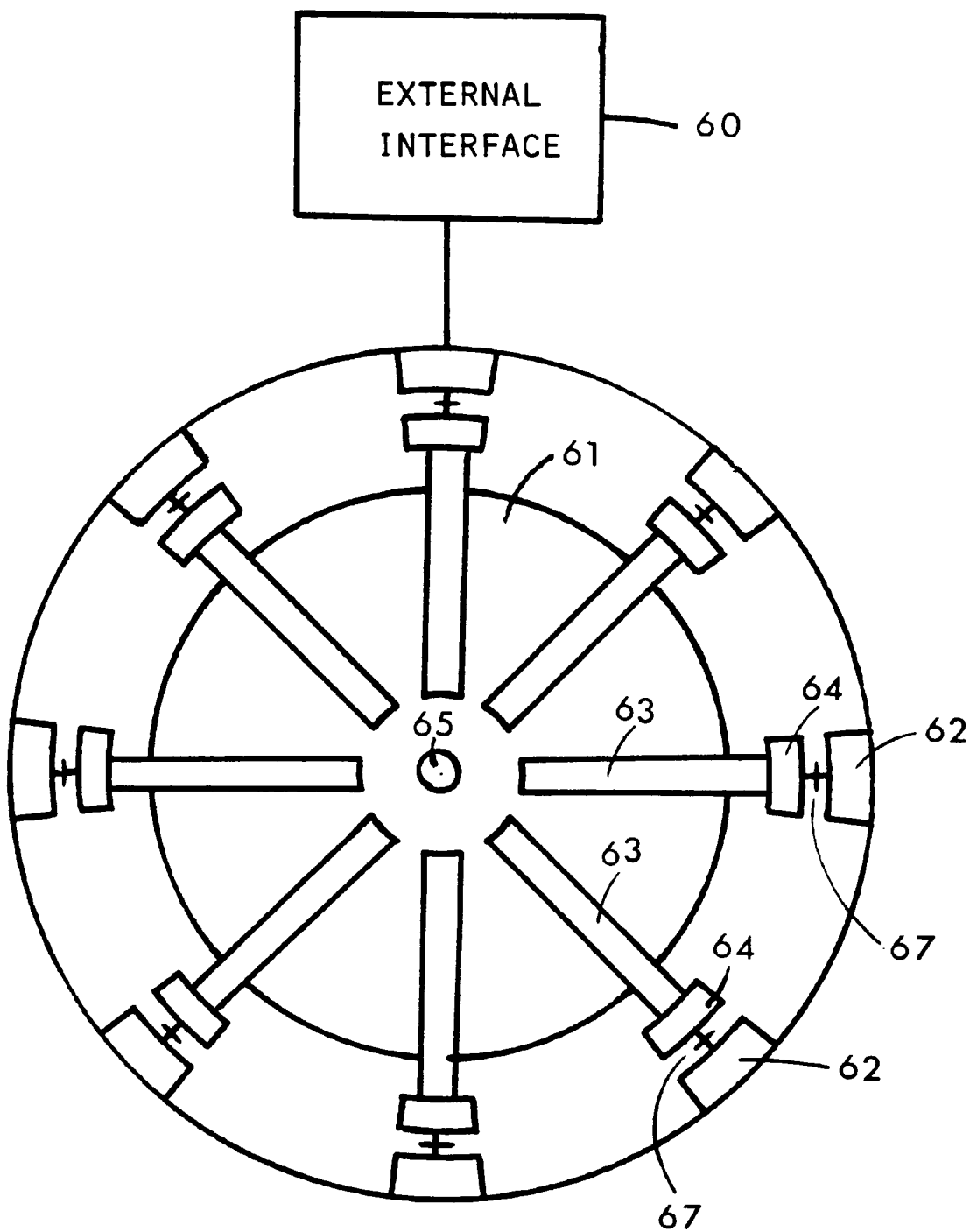
FIG. 13 is a "top" view of the multi-arm-track-per-head high data rate high density magnetic drive of the present invention.

A plurality of the magnetic head linear arms 63 can be deployed with a disk surface to provide multiple accesses to data tracks simultaneously to satisfy simultaneous external service requests, as illustrated in FIG. 13. Each arm 63 has a plurality of read/write heads, each subhead is fixed on a track of the disk. This track-per-head structure enables read/write operations without requiring mechanical movement of the read/write heads. FIG. 13 illustrates deployment of eight magnetic head linear arms of the present invention with a magnetic medium disk. Therein 61 is the surface of a disk fixed to a spindle 65. The eight magnetic head linear arms 63's are shown over the disk space. Each arm 63 is connected to an arm joint 64. The joint 64 is stacked with the bottom most one linked to a rotary coil motor 62. The rotary coil motor is controlled by signal coming from the motor control IC. The Motor 62 causes pushing or pulling the arm assembly 63 and 64 to align an arm, affected by temperature change, with the tracks for read/write operations. A plurality of such access arms are connected to the external interface 60 to support a plurality of simultaneous external service requests.

Figure 14:
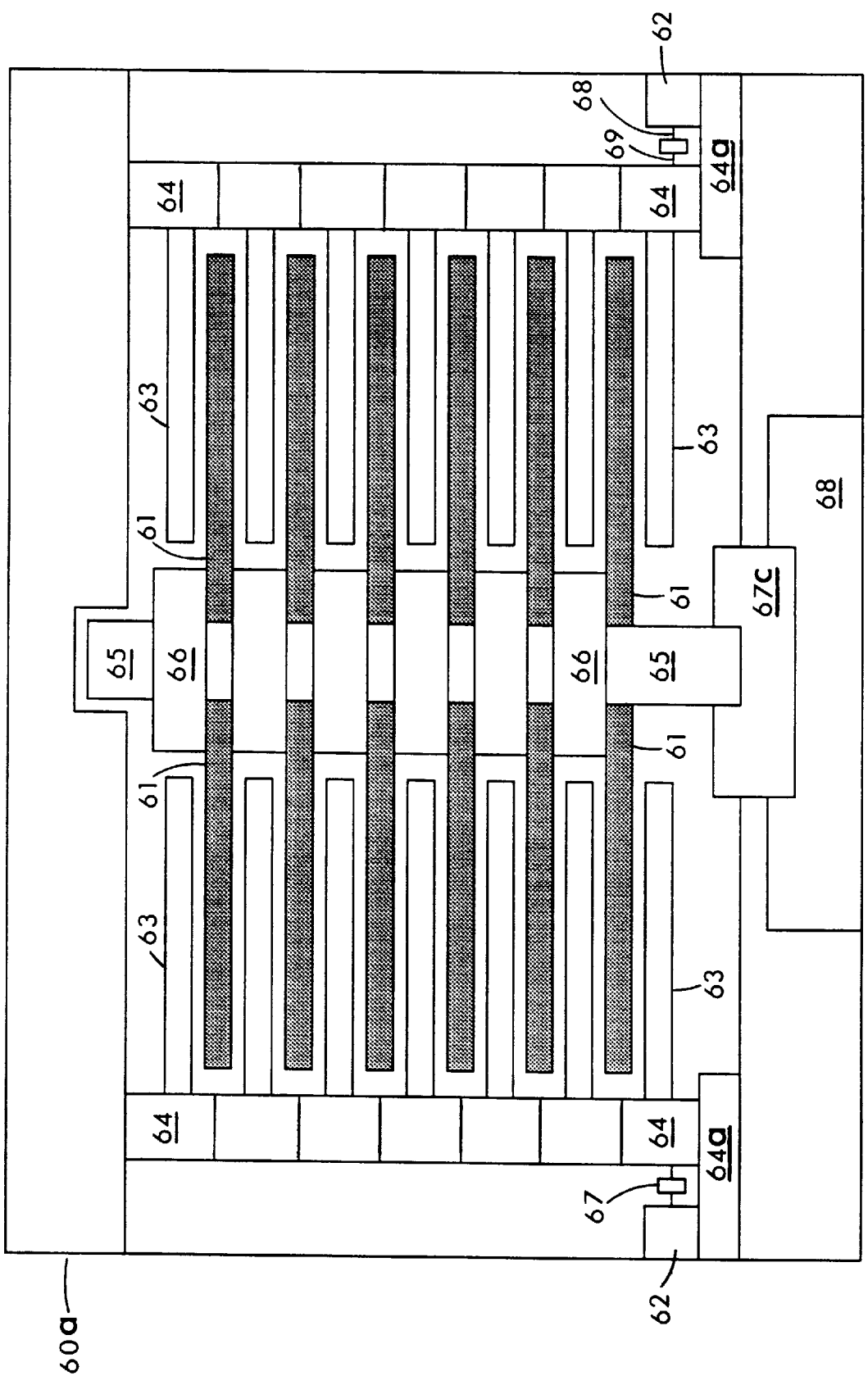
FIG. 14 is a cross-section view of the disk drive showing the media disks rotatably mounted within the housings in a spaced apart relation with the multi-arm-track-per-head of the preferred embodiment in the present invention.

FIG. 14 is a cross-section view of the disk drive showing the media disks 61 rotatably mounted within the housings in a spaced apart relation with the magnetic head linear arm 63. The disk drive 60a comprises a plurality of vertically stacked media disks 61 in a space relationship with one another. The disks 61 are mounted on the spindle 65 with a mounting collar 66 rotated by the motor 68. The spindle 65 is connected to the motor 68 with the motor collar 67c.

Each of the magnetic head linear arm 63 has a plurality of electromagnetic heads (not shown in FIG. 14) etched therein on each side of the head arm that faces the corresponding surface of a media disk 61. All the heads etched on the surface of a magnetic head linear arm are placed in a single plane on the surface of the arm.

Each magnetic head linear arm has a joint 64 in which demultiplexers are housed. A demultiplexer routes information to be written to a track through a magnetic head. A multiplexer routes information read from a track through a magnetic head. The joints of the magnetic head linear arms are stacked in a unit as illustrated in FIG. 14. The bottom-most joint 64 has a screw that is connected to a nut 67. The nut 67 is fixed to the shaft of the coil motor 62.

Figure 15:
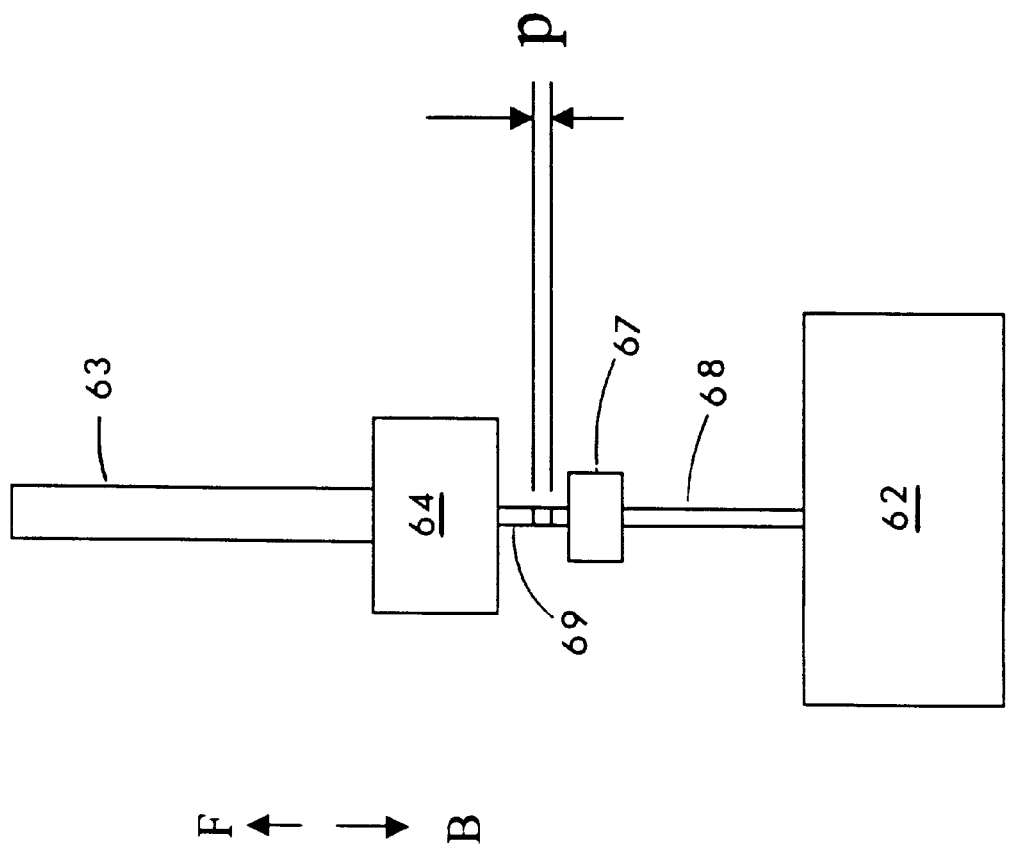
FIG. 15 depicts a top view of an assembly of a track-per-head single disk access arm of the preferred embodiment of the present invention.

FIG. 15 shows a "top" view of a disk access arm assembly. 63 is a disk access arm having an arm joint 64. A plurality of thin film magnetic read/write heads are structured in 63 (as herein described in FIG. 21–FIG. 26). A bolt 69 having a pitch p is fixed to the bottom arm joint 64. 62 is a rotary coil motor (or servo) that is used to drive the subassembly 63, 64, and 69 in a "forward", F, or "backward", B, direction. 68 is the shaft of the motor 62. 67 is a nut fixed to shaft 68. The bolt 69 is screwed into nut 67. A driving force from 62 turns 67 in one direction, causing a forward movement in a slight distance of said subassembly 63, 64, and 69. A driving force from 62 turning 67 in another direction causes a backward movement in a slight distance of said subassembly. The distance in the movement is computed by $$f=(p\times\theta)/360$$

where f is the linear distance in micron(s) of said subassembly 63, 64, and 69; p is the pitch in micron(s) of bolt 69; θ is the nut angular rotation in degree(s). This slight distance movement distance f is necessary to align the read/write heads with the tracks on the media disk surface in case head-track misalignment occurs due to change in environment temperature.

Figure 16:
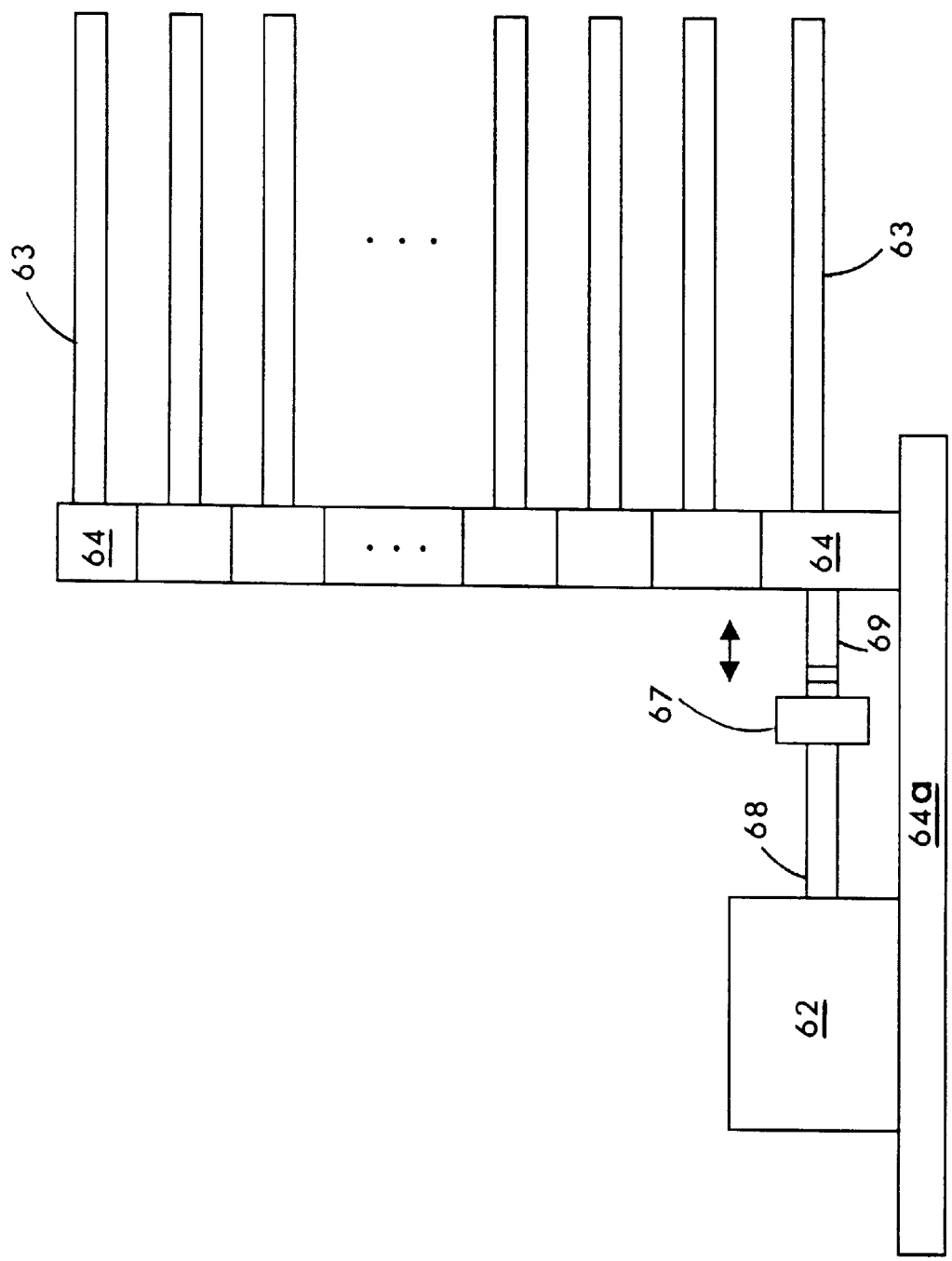
FIG. 16 shows a "right-hand" view of the assembly depicted in FIG. 15.

FIG. 16 is a right-hand side view of the top view in FIG. 15. A disk access arm 63 is assembled into an arm joint 64. Subassembly 63 and 64 is to access a disk surface and is "modularized" into an assembly for accessing a plurality of disk surfaces. A driving force from motor 62 drives the subassembly 69, 64, and 63 a slight distance to the right (forward), F, or left (backward), B, direction, as described in FIG. 15.

Figure 17:
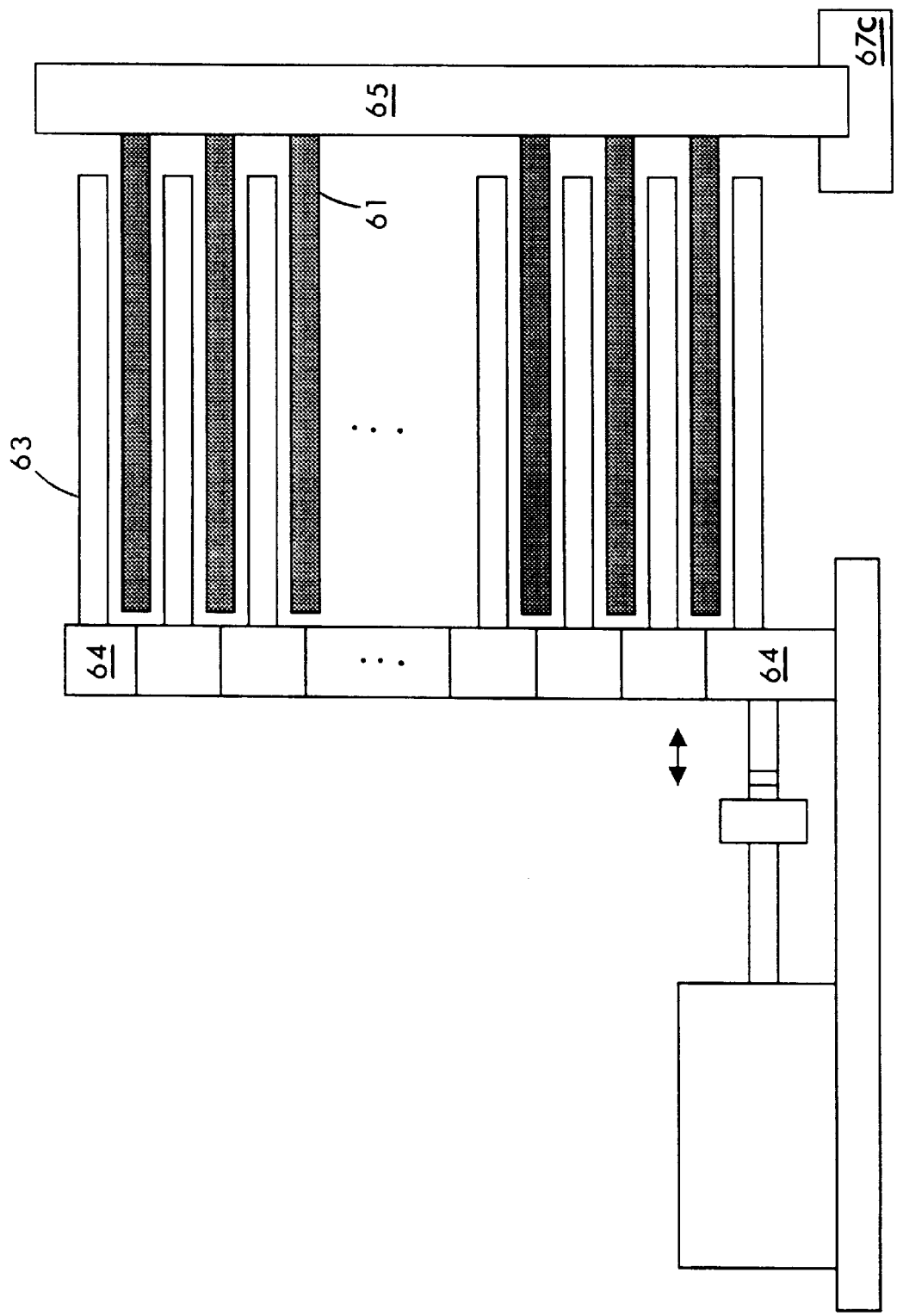
FIG. 17 is a schematic view of the assembly in FIG. 16 arranged with a fragmentary view of the media disk.

FIG. 17 shows a simplified view of space relationship between disk 61 disk and disk access arm assembly. 61 is a media disk having two surfaces. 65 is the disk spindle and 67c is the motor collar driving the spindle 65.

Figure 18:
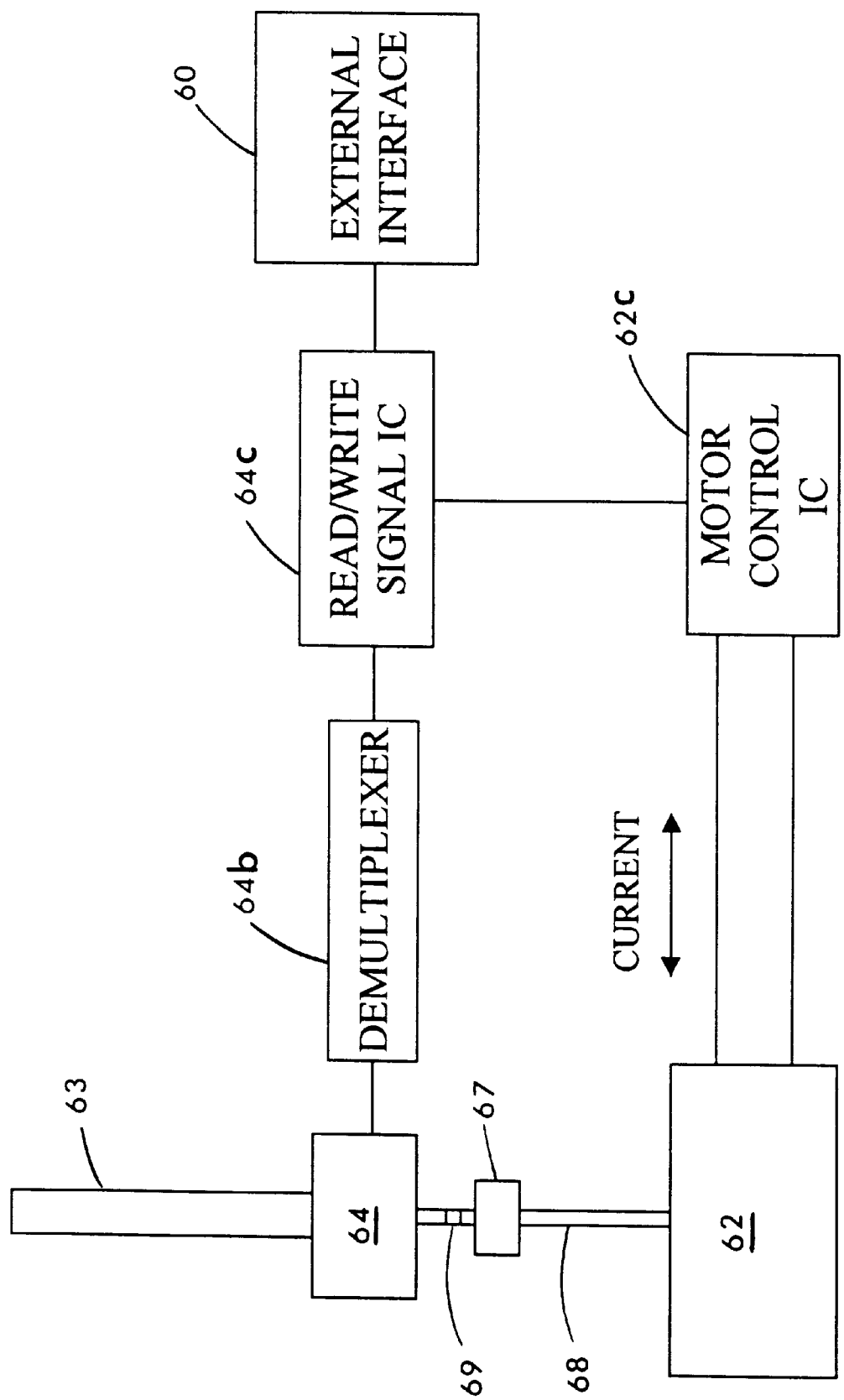
FIG. 18 is an illustration of a relationship between the assembly in FIG. 15 and a rotary coil motor control integrated circuit (IC).

FIG. 18 is a schematic view of the top view shown in FIG. 15 with disk access arm control and motor control. Each read/write head in 63 is connected to a demultiplexer 64b located at arm joint 64 which in turn connects to a read/write signal IC 64c. Motor 62 is connected to a Motor Control IC 62c which regulates direction and current to send to 62 to cause turning of nut 67. Before a read or write operation begins, the read/write head-disk track alignment information is read through 64b to 64c. If 64c senses misalignment exists due to temperature change, a signal is sent to 62c to send current to 62 to move 63 for head/track alignment. Read/write operation is then activated. The EXTERNAL INTERFACE 60 receives simultaneous external read/write requests and schedules a number of disk access arms for simultaneous read/write operations to satisfy the requests. Data read, or signal indicating data written, are returned to 60, which in turn sends the information back to the external requests.

Figure 19:
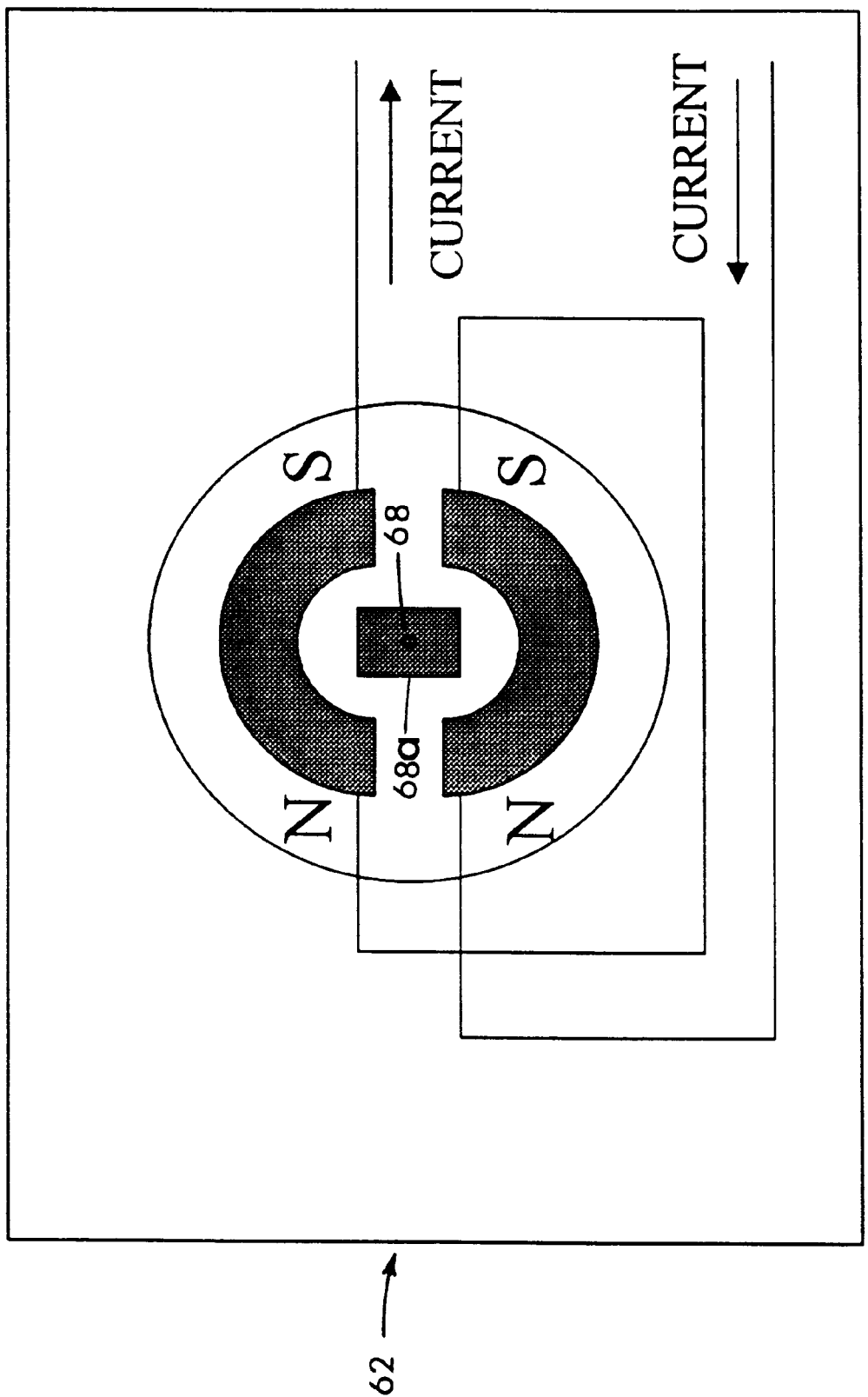
FIG. 19 is a simplified cross-section view of the rotary coil motor for alignment of the media disk and the disk access arm depicted in FIG. 15.

FIG. 19 is a cross-section view of the rotary coil motor 62. A permanent magnet 68a is enclosed within two opposing electromagnetic coils, each having a north (N) and a south (S) pole. A magnetic field opposing the permanent magnet is produced when current flows through the coil. The motor shaft 68 is attached to the permanent magnet 68a. The permanent magnet 68a rotates with the shaft 68 and the screw nut 67 when the force of opposition causes a deflection that is in direct proposition to the amount of driving current. Nut 67 drives the bolt 69 to effect a slight pushing or pulling of the disk access arm assembly which, in turn, moves the access arm assembly a slight distance in a "forward" or "backward" direction, as described in FIG. 15. This movement aligns the magnetic read/write head in the access arm with the media track in case the head/track misalignment occurs due to change in environment temperature.

Figure 20:
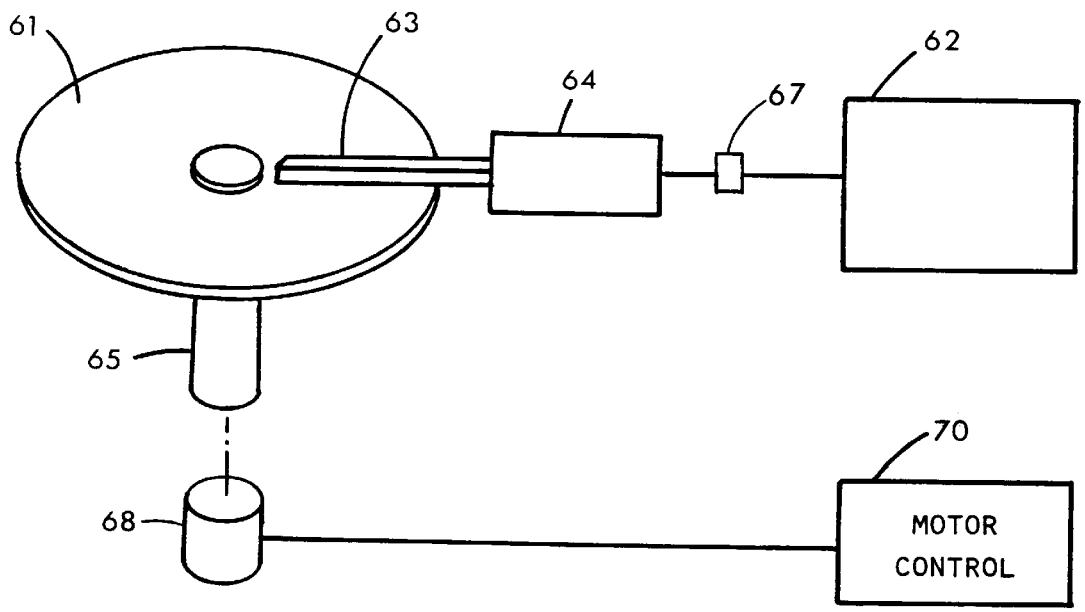
FIG. 20 shows a schematic view of a space relationship between a surface of media disk and a track-per-head disk access arm.

FIG. 20 shows deployment of the magnetic head linear arm 63 with a magnetic medium disk drive of the present invention. A magnetic disk 61 is fixed to a spindle 65 and is rotated by motor 68. The motor is controlled by the motor control signal from circuitry 70. There is no slider in this arrangement. Mechanical movement to position the linear arm 63 for accessing data tracks is totally eliminated, as this is the "track per head" magnetic medium data storage arrangement. The arm 63 is fixed just over the disk surface 61, and is connected to the arm joint 64. Joint 64 is connected to a rotary coil motor 62 through nut 67. Proper rotation of Motor 62 in different direction causes pushing or pulling the arm assembly 63/64 to adjust misalignment between magnetic heads in arm 63 with tracks on the media disk 61 caused by temperature change, as described in FIG. 15.

Figure 21:
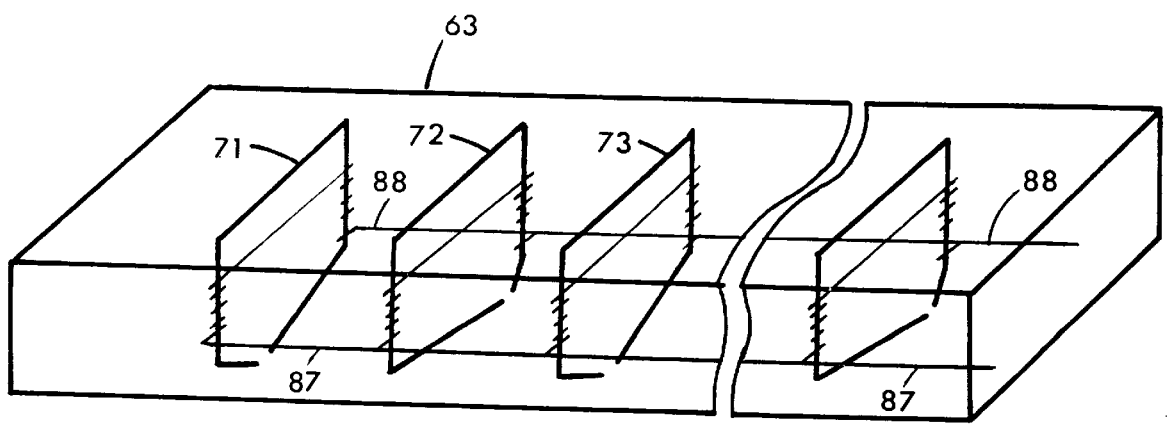
FIG. 21 is a perspective view of the thin film magnetic heads arranged in a linear arm deployed in the magnetic drive of the present invention.

FIG. 21 shows a plurality of thin film magnetic heads stacked in the linear arm 63 shown in FIG. 20, wherein 71, 72, and 73 represent the "first", "second", and "third" magnetic heads in the arm. And so on. 64 is an arm joint that contains a plurality of demultiplexers that switch read/write signals to proper magnetic heads in arm 63 for read/write operations. Each magnetic head is connected to 64 via lines 88 and 87 which are the two terminal lines of each head.

Figure 22:
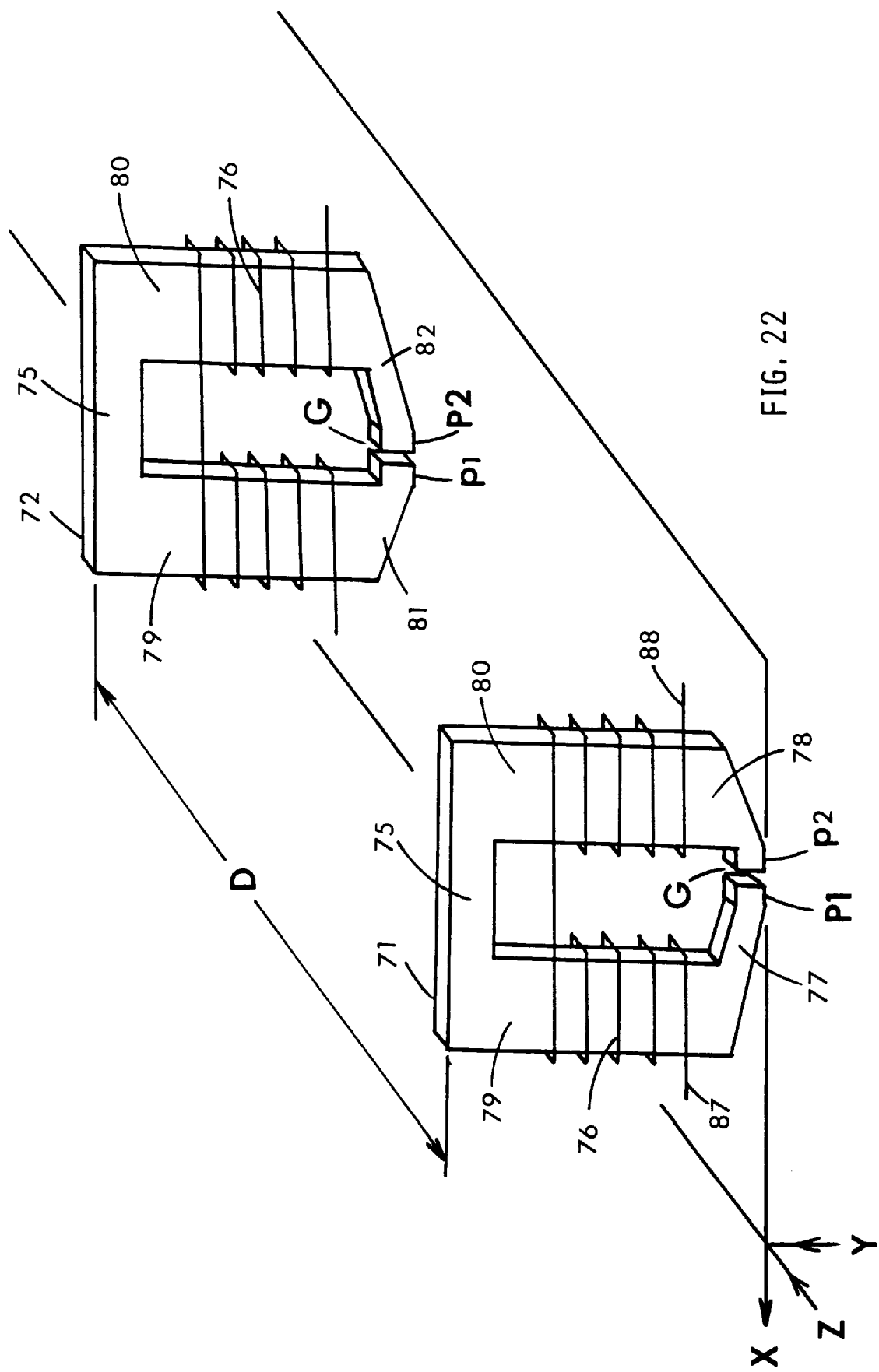
FIG. 22 is a schematic illustration showing a plurality of thin film magnetic heads stacked in a linear arm of the present invention.

In FIG. 22, the "first" magnetic head 71 has two pole pieces 79 and 80 and a back portion 75. The head 71 has two front portions 77 and 78 which, in turn, have two pole tips P1 and p2, respectively, with a gap layer G. The pole tip P1 is formed by the long front portion 77 of the pole piece 79 and the pole tip p2 is formed by the short front portion 78 of the pole piece 80 of the first magnetic head 71. The second magnetic head 72 has two pole pieces 79 and 80 and a back portion 75. The head 72 has two front portions 81 and 82 which, in turn, have two pole tips p1 and P2, respectively, with a gap layer G. The pole tip p1 is formed by the short front portion 81 of the magnetic pole 79 piece and the pole tip P2 is formed by the long front portion 82 of the pole piece 80 of the second magnetic head 72. The third magnetic head 73, not shown in FIG. 22, depicted in FIG. 24 has pole tips P1 and p2. The fourth magnetic head 74 illustrated in FIG. 24, has pole tips p1 and P2. And so on. The distance D between two magnetic heads is the head pitch, and is 2–5 microns in the present invention. The thickness of each magnetic head is 1–3 microns.

Figure 23:
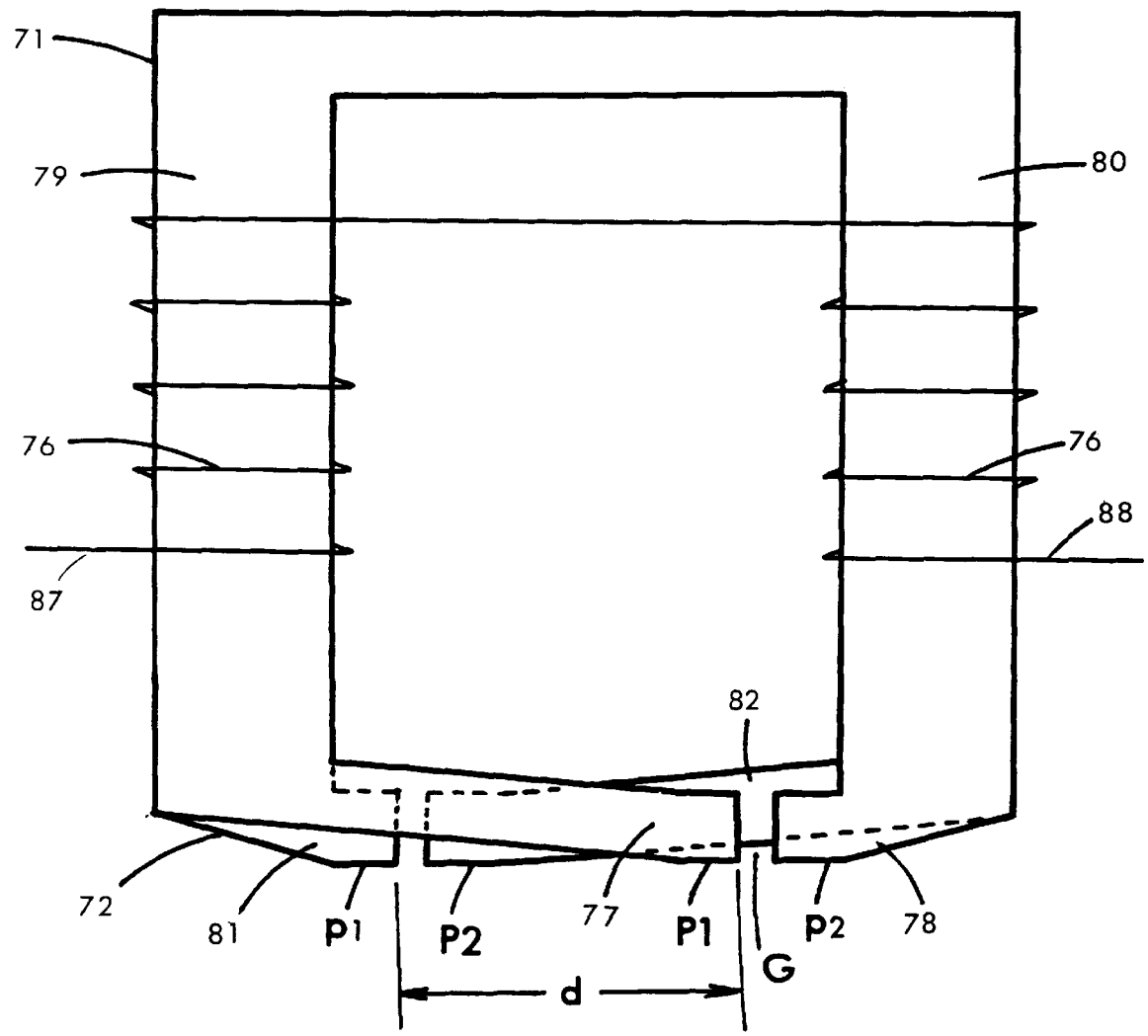
FIG. 23 is a "top" view of the magnetic head linear arm seen in the direction of Z in FIG. 22.

FIG. 23 shows a "top" view of the magnetic head linear arm, as seen in the direction of Z in FIG. 22. Therein 71 represents the "first" head in the arm; behind the first head 71 is the "second" head 72 in the arm; and so on. The coil 76 is coiled about the pole pieces 79 and 80 of the first head 71, and the second head 72, and so on. At the ends of the coil 76 are two terminal ends 87 and 88. 77 and 78 are the long and short front portions of the pole pieces 79 and 80 of the first magnetic head 71, respectively. 81 and 82 are the short and long front portions of the pole pieces 79 and 80 of the second magnetic head 72, respectively; and so on. The pole tips P1 and p2 are at the end of the pole pieces 77 and 78 of the first magnetic head 71, respectively; the pole tips p1 and P2 are at the end of the pole pieces 81 and 82 of the second magnetic head 72, respectively; and so on. The distance d in the figure is the gap pitch between two gaps of two magnetic heads, such as that of magnetic heads 71 and 72 in FIG. 23. The acceptable gap pitch d is 1–10,000 microns.

Figure 24:
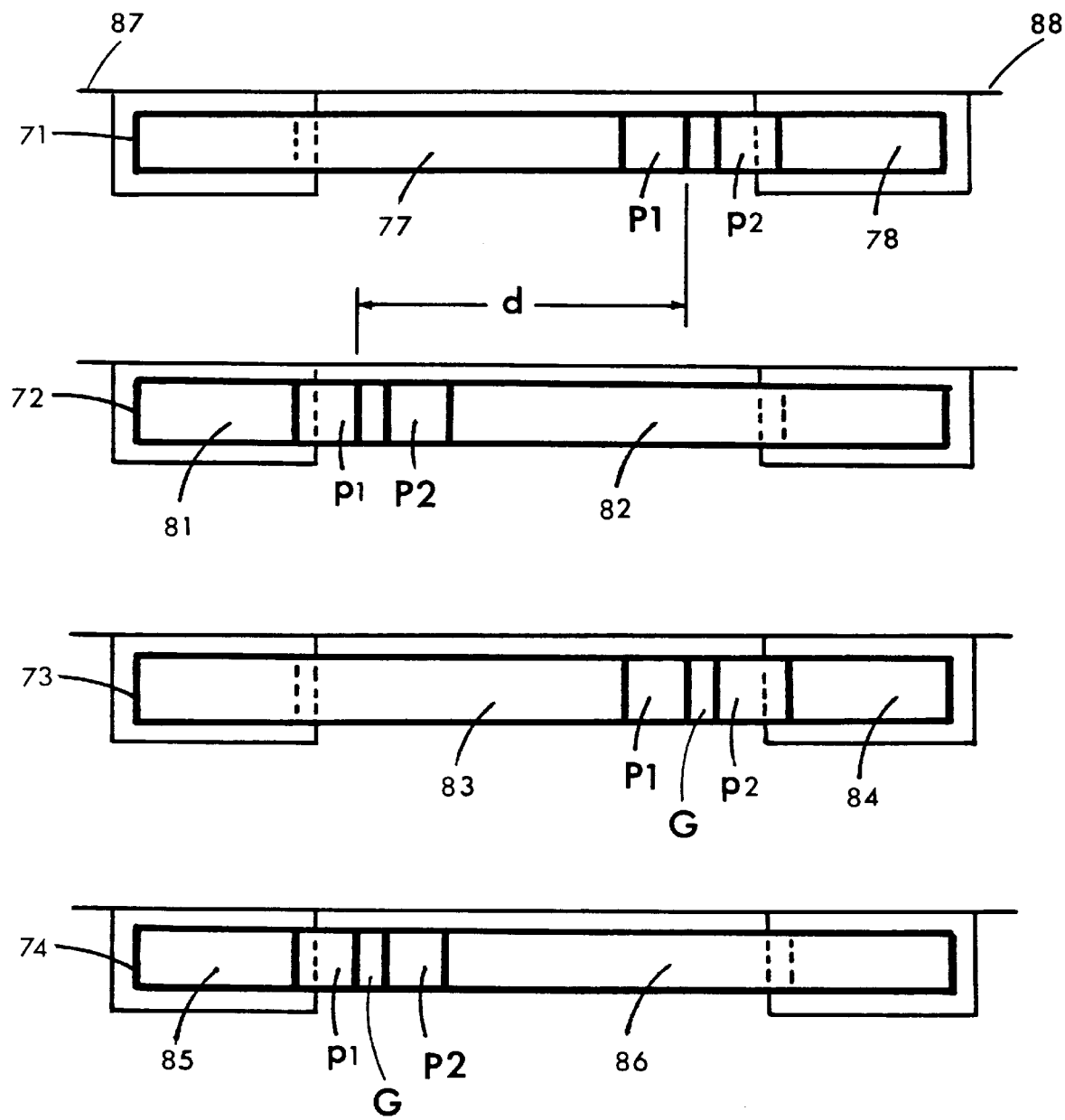
FIG. 24 is a "front" view of the magnetic head linear arm seen in the direction of Y in FIG. 22.

FIG. 24 depicts a "front" view of a portion of the magnetic head linear arm, as seen in the direction of Y in FIG. 22. Therein 71, 72, 73, and 74 are the "first", "second", "third", and "fourth" magnetic heads in the linear arm; 77, 81, 83, and 85 are the long, short, long, and short front portions of the first pole pieces of the first, second, third, and fourth heads respectively; 78, 82, 84, and 86 are the short, long, short, and long front portions of the second pole pieces of the first, second, third, and fourth heads respectively. The pole tips P1 and p2 are located at the ends of the front portions 77 and 78, respectively; the pole tips p1 and P2 are located at the ends of the front portions 81 and 82, respectively; and so on. The gap pitch d between two magnetic heads, such as between 71 and 72, is also shown in FIG. 24.

In FIGS. 22, 23, and 24, the magnetic heads in a linear arm have the pole tips arranged alternatively in a P1T/G/p2T, p1T/G/P2T, P1T/G/p2T, p1T/G/P2T, and so on, relationship for the first, second, third, fourth magnetic heads, and so on, respectively.

Figure 25:
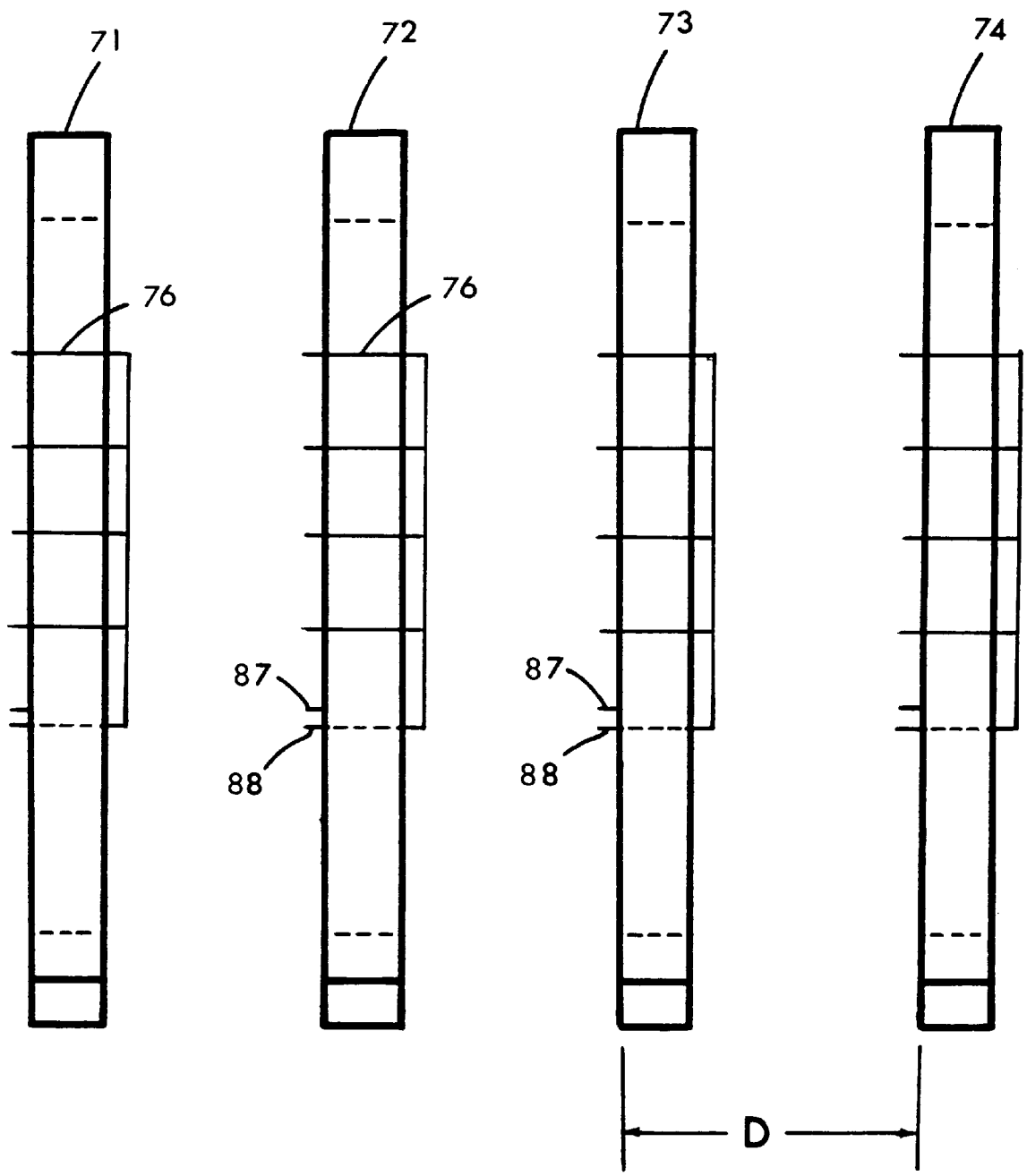
FIG. 25 is a "right-hand-side" view of the magnetic head linear arm seen in the direction of X in FIG. 22.

FIG. 25 gives a "right-hand-side" view of the magnetic head arm, as seen in the direction of X in FIG. 22. Therein 71, 72, 73, 74 represent the "first", "second", "third", and "fourth" magnetic heads in the linear arm. Therein 76 represents the conductor coiled about the pole pieces of the magnetic heads; 87 and 88 are the terminal ends of the conductor coil 76.

Figure 26:
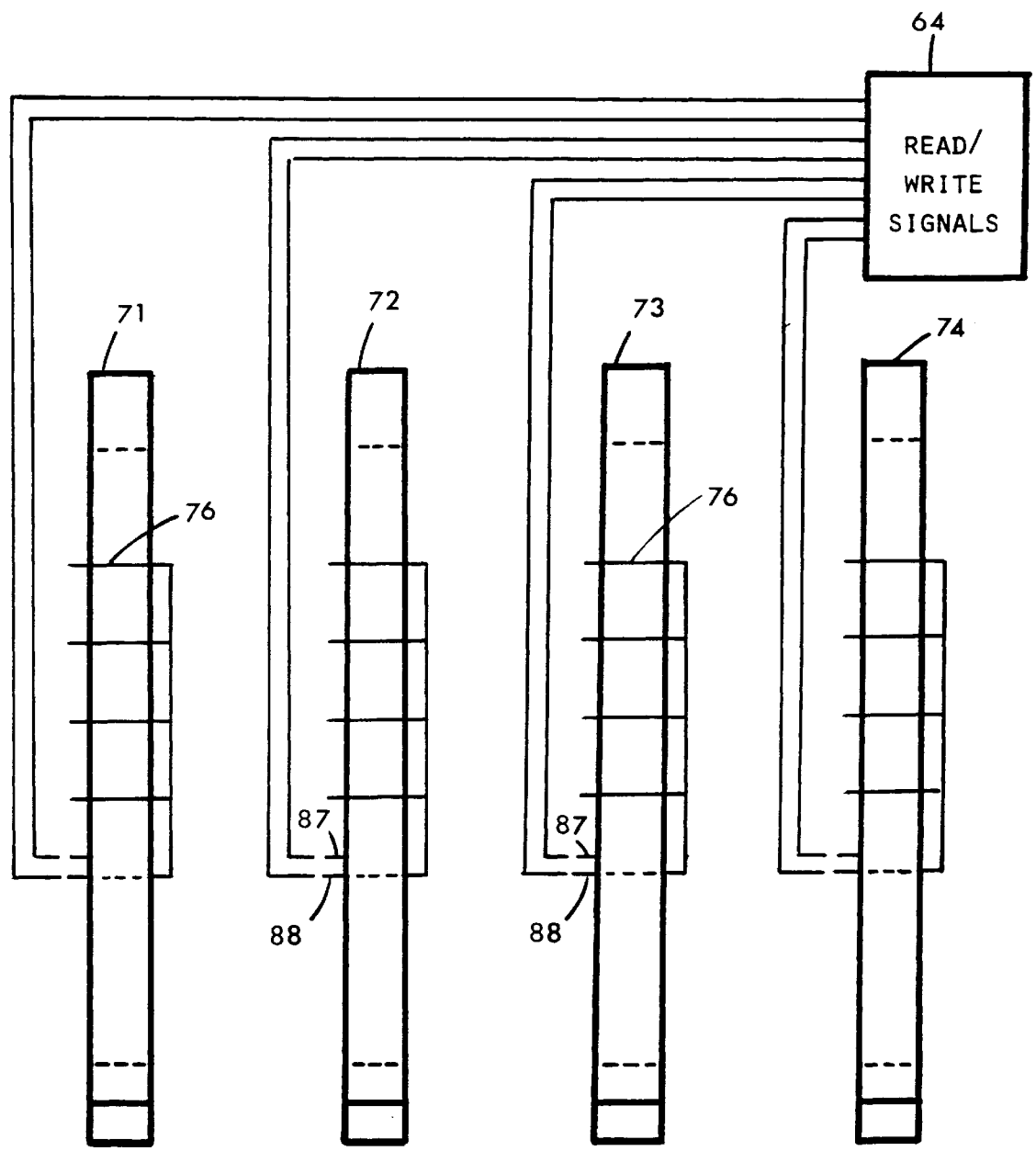
FIG. 26 is identical to FIG. 25 showing the coil conductor terminals connected to a read/write signal circuitry.

FIG. 26 is identical to FIG. 25. Therein it is shown that the terminal ends 87 and 88 of each magnetic head are connected to the arm joint (read/write signals circuitry) 64.

Figure 27:
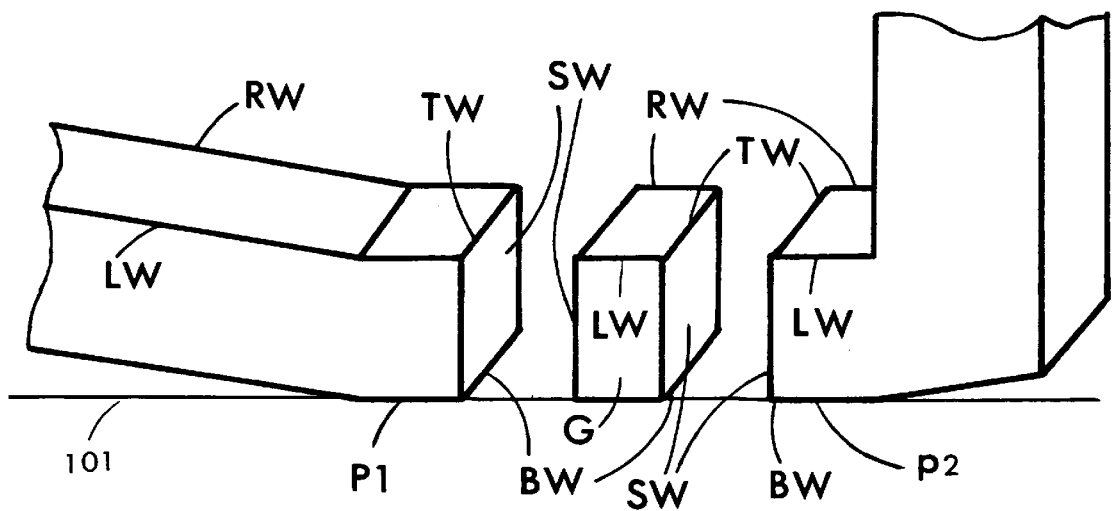
FIG. 27 shows an enlarged arrangement of the pole tip P1 T, the gap layer G, and the pole tip p2 T.

FIG. 27 shows an enlarged isometric diagram of the pole tips P1 and p2 and the gap layer G. Each of the pole tips P1 and p2 (or p1 and P2) has a thin film left wall (LW), right wall (RW), top wall (TW), bottom wall (BW), and side wall (SW). The LW and RW are bounded in part by the TW, SW, and BW. The walls TW, SW, and BW are contiguous with respect to each other. The SW of the pole tips P1 and p2 are facing each other. Between the pole tips P1 and p2 is the gap layer G having LW, RW, TW, SW, BW, and SW. The LW and RW of gap layer G are bounded by TW, SW, BW, and SW, which are contiguous with respect to each other of the gap layer G. The bottom walls BW of P1, G, and p2 are arranged in a common plane 101 which forms a portion of an air contacting surface.

Figure 28:
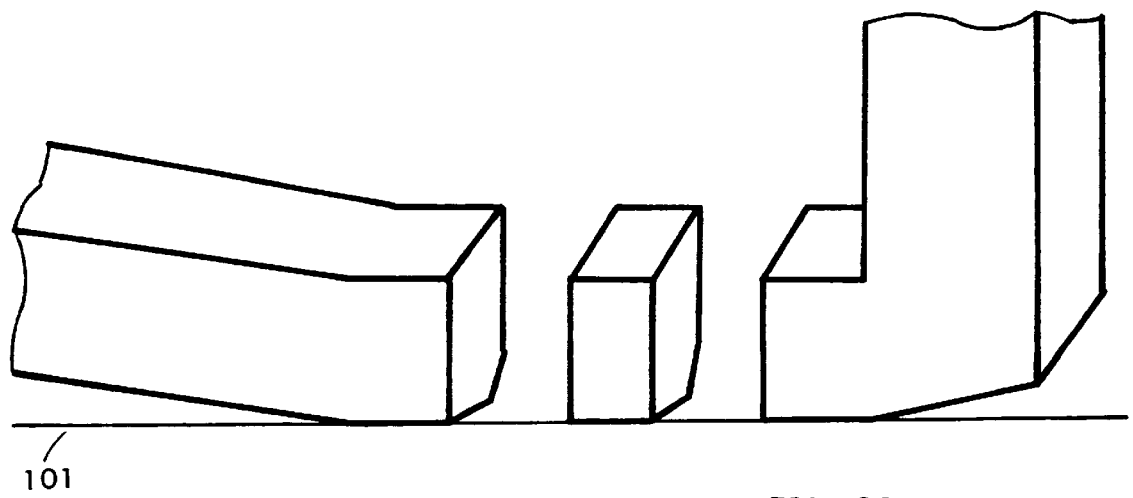
FIG. 28 is identical to FIG. 27 that shows the bottom wall of the pole tips P1 T and p2 T and the gap layer G being in a shape other than flat, such as in a V shape.
Figure 30:
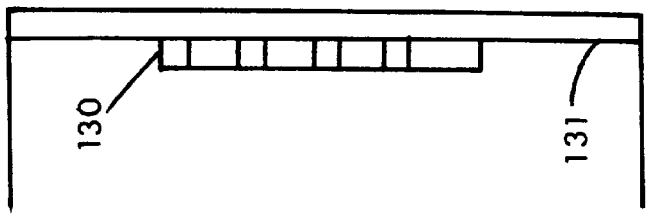
FIG. 30 shows the right-hand-side view in constructing the lower segments of the coil conductor of a magnetic head.
Figure 29:
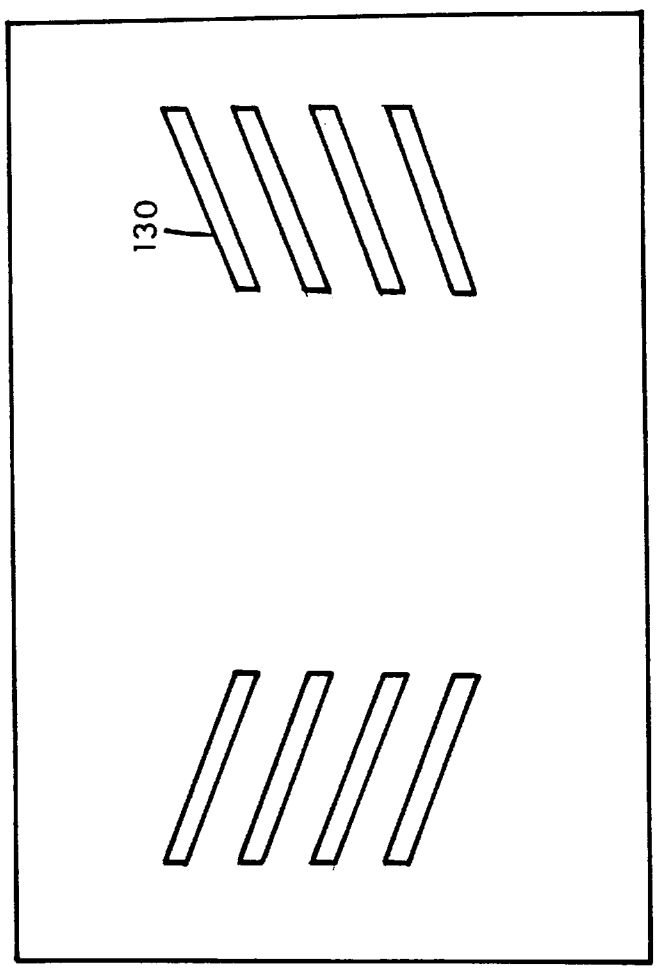
FIG. 29 shows the top views in constructing the lower segments of the coil conductor of a magnetic head.
Figure 31:
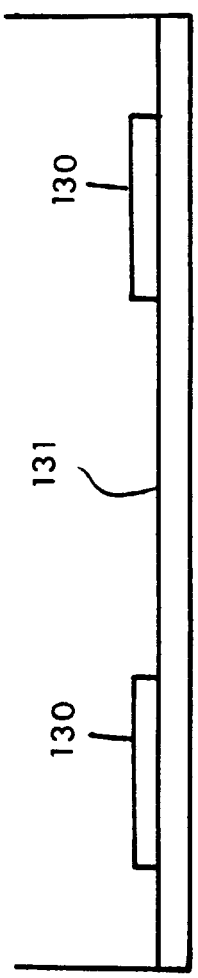
FIG. 31 shows the front view in constructing the lower segments of the coil conductor of a magnetic head.
Figure 32:
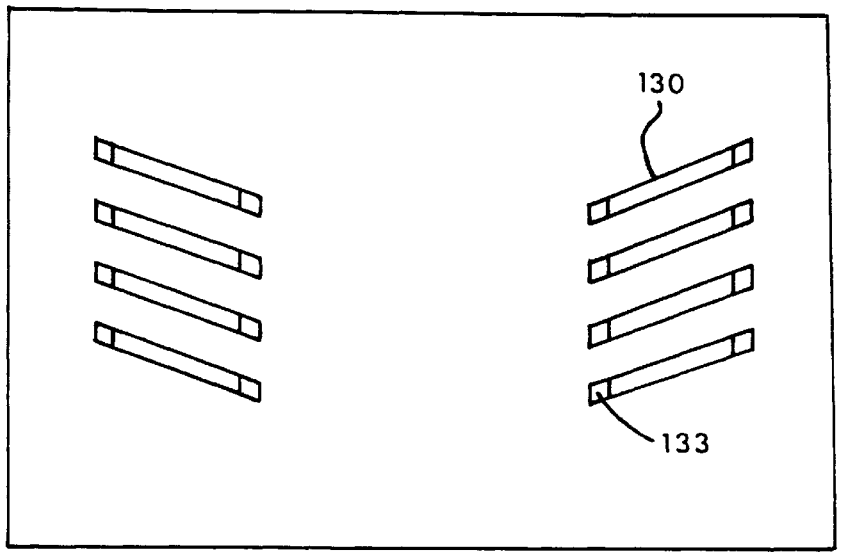
FIG. 32 illustrates the top view in constructing the vertical portions of the coil conductor of a magnetic head.
Figure 33:
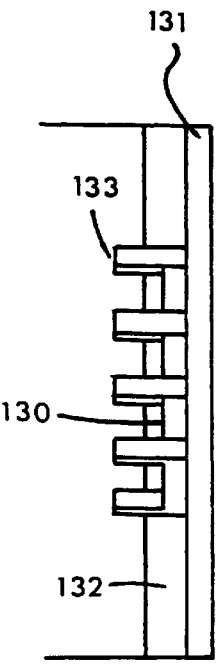
FIG. 33 illustrates the right-hand-side view in constructing the vertical portions of the coil conductor of a magnetic head.
Figure 34:
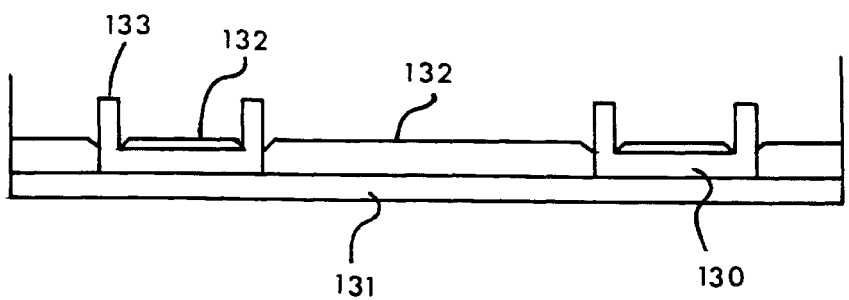
FIG. 34 illustrates the front view in constructing the vertical portions of the coil conductor of a magnetic head.
Figure 36:
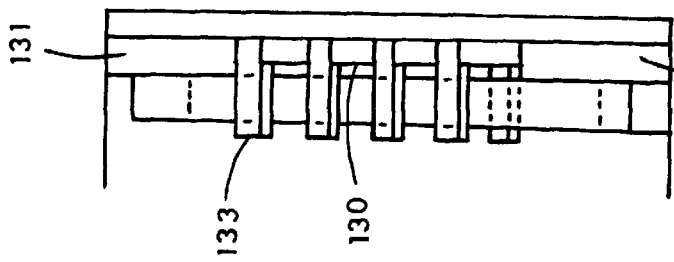
FIG. 36 depicts the right-hand-side view in plating the pole pieces of the magnetic head.
Figure 35:
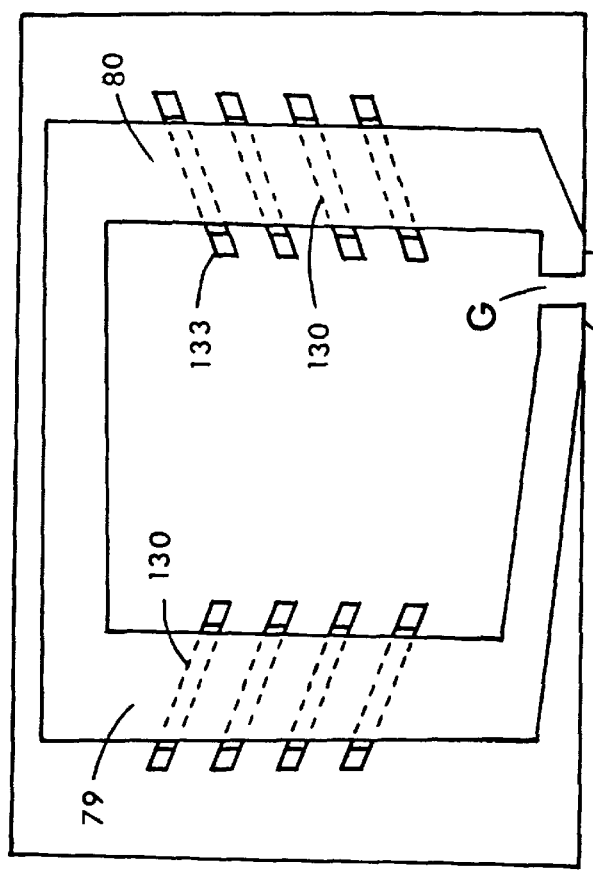
FIG. 35 depicts the top view in plating the pole pieces of a magnetic head.
Figure 37:
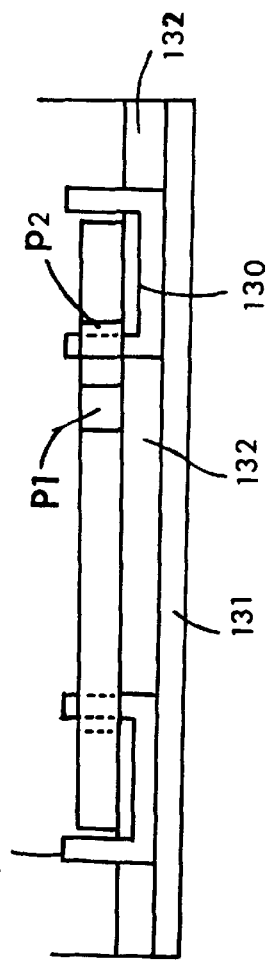
FIG. 37 depicts the front view in plating the pole pieces of the magnetic head.
Figure 39:
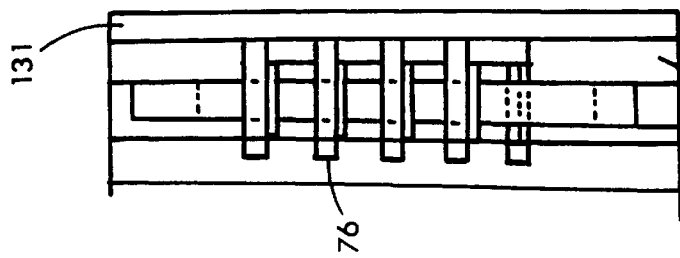
FIG. 39 shows the right-hand-side view in constructing the upper segments of the coil conductor being coiled about the pole pieces of a magnetic head.
Figure 38:
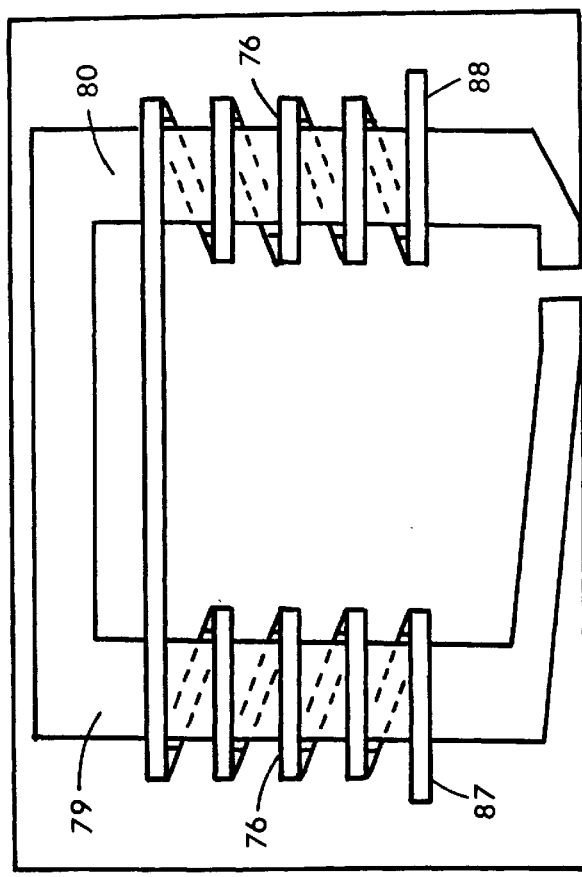
FIG. 38 shows the top view in constructing the upper segments of the coil conductor being coiled about the pole pieces of a magnetic head.
Figure 40:
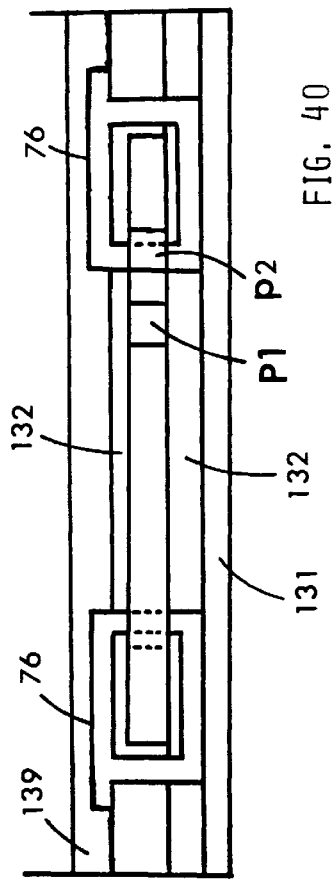
FIG. 40 shows the front view in constructing the upper segments of the coil conductor being coiled about the pole pieces of a magnetic head.

FIG. 28 shows contents identical to that of FIG. 27, with the exception the BW of pole tips P1 and p2 (or p1 and P2) and the layer G being in a V shape.

The magnetic head in the present invention can be constructed using currently available photolithographic, vacuum, patterning, sputtering, and thin film techniques. The construction of the first magnetic head with a pole tips P1T/G/p2T is illustrated in FIGS. 29 to 40. A photo plating process is used for construction, on substrate 131, of the lower portions 130 of the coil for winding about the magnetic head pole pieces. The results are shown in the top, right-hand-side, and front views in FIGS. 29, 30, and 31, respectively. An insulation layer 132 is then formed and the vertical segments of the coil 133 are then constructed, as shown in the top, side, and front views in FIGS. 32, 33, and 34, respectively. The pole pieces of the magnetic head is then deposited, as shown in the top, side, and front views in FIGS. 35, 36, and 37, respectively.

An insulation layer 132 is then formed again for construction of the upper segments 76 of the coil. The upper segments of the coil are then constructed, as shown in the top, side, and front views in FIGS. 38, 39, and 40, respectively.

I claim:

1. A thin film magnetic head linear arm, having a head surface, comprising:

(a) a support member having a surface which constitutes a part of said head surface;

(b) a plurality of thin film magnetic heads etched into said support member;

(c) said thin film magnetic heads being of first and second types: the heads of the first type each having first and second pole pieces connected by a back portion, a front portion of the first pole piece being a long pole tip, P1T, and a front portion of the second pole piece being a short pole tip, p2T; the heads of the second type each having first and second pole pieces connected by a back portion, a front portion of the first pole piece being a short pole tip, p1T, and a front portion of the second pole piece being a long pole tip, P2T;

(d) a gap layer, G, being placed between the long and short pole tips of said thin film magnetic head of the first type forming a tip and gap layer relationship P1T|G|p2T, and being placed between the short and long pole tips of said thin film magnetic head of the second type forming the tip and gap layer relationship p1T|G|P2T;

(e) said long pole tip, and short pole tip, of each said thin film magnetic head having top and bottom oppositely facing film walls which are bounded in part by a side wall, a left (or front) wall, and a right (or back) wall, the top wall and side wall and bottom wall being contiguous with respect to each another;

(f) said side walls of each pair of pole tips being oppositely faced one another;

(g) said gap layer having top and bottom oppositely facing film walls being bounded in part by two side walls and a left (or front) wall and a right (or back) wall;

(h) the bottom walls of all said long pole tips and short pole tips and the bottom walls of all said gap layers, of all said thin film magnetic heads, being arranged lying on a common plane forming a portion of said head surface;

(i) each said thin film magnetic head being coiled by a conductor a number of turns about the first pole piece and/or the second pole piece, or about the back portion, said conductor having first and second terminal ends for feeding signals to said head or reading signals from said head;

(j) all said thin film magnetic heads of two types being stacked into said support member alternatively in a first type head, second type head, first type head, second type head arrangement in a one-by-one, front-back relationship;

(k) all said conductor terminal ends of all said thin film magnetic heads in said support member being connected to a demultiplexer which connects to a read/write signal integrated circuit;

(l) means for connecting said conductor terminal ends of all said thin film magnetic heads to said demultiplexer and said read/write signal integrated circuit.

2. A magnetic disk drive comprising:

(a) a plurality of magnetic disks;

(b) a plurality of concentric data tracks on each surface of said disks;

(c) a thin film magnetic head linear arm accessing, including creating, writing data into, and reading data from, said concentric data tracks on a surface of said end of disks;

(d) said thin film magnetic head linear arm, having a head surface, comprising: a support member having a surface which constitutes a part of said head surface; a plurality of thin film magnetic heads etched into said support member; said thin film magnetic heads being of first and second types: the heads of the first type each having first and second pole pieces connected by a back portion, a front portion of the first pole piece being a long pole tip, P1T, and a front portion of the second pole piece being a short pole tip, p2T; the heads of the second type each having first and second pole pieces connected by a back portion, a front portion of the first pole piece being a short pole tip, p1T, and a front portion of the second pole piece being a long pole tip, P2T; a gap layer, G, being placed between the long and short pole tips of said thin film magnetic head of the first type forming a tip and gap layer relationship P1T/G/p2T, and being placed between the short and long pole tips of said thin film magnetic head of the second type forming a tip and gap layer relationship p1T/G/P2T; each said thin film magnetic head being coiled by a conductor a number of turns about the first pole piece and/or the second pole piece, or about the back portion, said conductor having two terminal ends for feeding signals to said head or reading signals from said head; all said thin film magnetic heads of first and second types being stacked into said support member alternatively in a first type head, second type head, first type head, second type head arrangement in a one-by-one, front-back relationship;

(e) an arm joint being connected to said thin film magnetic head linear arm for supporting and positioning said linear arm over said surface of said disks;

(f) a demultiplexer being etched into said arm joint;

(g) a plurality of said thin film magnetic head linear arms, each said arm being connected to said arm joint, being organized into a module of thin film magnetic head linear arms for accessing said concentric data tracks on surfaces of said disks;

(h) a plurality of said modules of thin film magnetic head linear arms being organized into an assembly of modules of thin film magnetic head linear arms for accessing said concentric data tracks on surfaces of said disks;

(i) a thermal induced misregistration elimination apparatus consisting of a rotary coil motor (or servo), a motor control integrated circuit, a shaft, and a nut connected to said module of thin film magnetic head linear arms for adjustment of track-head misalignment caused by environmental factors such as temperature changes for said module;

(j) an external interface for writing data into external destinations and reading data from external sources;

(k) a read/write signal integrated circuit which interfaces with said external interface for writing data into, or reading data from, concentric data tracks on surfaces of said disks through said demultiplexers, and for sending track alignment information to said thermal induced misregistration elimination apparatus for adjusting track-head misalignment for all said assemblies of modules of thin film magnetic head linear arms;

(l) means for mounting the magnetic disks on a spindle;

(m) means for supporting the disks on said spindle;

(n) means for rotating the magnetic disks on said spindle;

(o) means for connecting each said thin film magnetic head linear arm to said arm joint and for positioning said linear arm over said surface of said disks;

(p) means for positioning said module of thin film magnetic head linear arms over said surfaces of said disks;

(q) means for positioning said assembly of modules of thin film magnetic head linear arms over said surfaces of said disks;

(r) means for connecting said thin film magnetic head linear arms, module of said arms, and assembly of modules of said arms with said demultiplexers, read/write signal integrated circuit, external interface, motor control integrated circuit, and said thermal induced misregistration elimination apparatus.

3. A magnetic disk drive claimed in claim 2 including:

(a) means for generating a plurality of data tracks on surfaces of said disks through said thin film magnetic head linear arms;

(b) means for said thin film magnetic head linear arms to access, including creating, writing data into, and reading data from, said concentric data tracks on surfaces of said disks on a track-per-head basis without requiring movement of said linear arms;

(c) means for writing data from said read/write signal integrated circuit through said demultiplexers and said thin film magnetic head arms into concentric data tracks on surfaces of said disks;

(d) means for reading data from concentric data tracks on surfaces of said disks through said thin film magnetic head linear arms and demultiplexers and said read/write signal integrated circuit;

(e) means for reading simultaneous, non-simultaneous, or no operation signals from said external interface to said read/write signal integrated circuit;

(f) means for writing simultaneous, non-simultaneous, or no operation signals from said read/write signal integrated circuit into said external interface;

(g) means for reading thin film magnetic head/track alignment information from said concentric data tracks on surfaces of said disks through said thin film magnetic head linear arms and demultiplexers and said read/write signal integrated circuit and said motor control integrated circuit to regulate direction and current to be sent to said motor to adjust head/track misalignment.

* * * * *